(12) United States Patent
Yamaguchi et al.

(10) Patent No.: US 8,353,231 B2
(45) Date of Patent: Jan. 15, 2013

(54) BAR FEEDER

(75) Inventors: Mitsuyoshi Yamaguchi, Nagano (JP);
Shigeo Kuribayashi, Nagano (JP)

(73) Assignee: Alps Tool Co., Ltd., Nagano (JP)

( * ) Notice: Subject to any disclaimer, the term of this patent is extended or adjusted under 35 U.S.C. 154(b) by 0 days.

(21) Appl. No.: 13/188,984

(22) Filed: Jul. 22, 2011

(65) Prior Publication Data

US 2011/0271803 A1 Nov. 10, 2011

Related U.S. Application Data

(62) Division of application No. 11/976,124, filed on Oct. 22, 2007, now Pat. No. 8,051,755.

(30) Foreign Application Priority Data

Oct. 24, 2006 (JP) .................................. 2006-288987
Oct. 26, 2006 (JP) .................................. 2006-290759
Oct. 31, 2006 (JP) .................................. 2006-296238

(51) Int. Cl.
*B23B 13/10* (2006.01)

(52) U.S. Cl. ............................... 82/124; 82/125; 82/127

(58) Field of Classification Search .................... 82/124, 82/125, 126, 127; 414/14, 15, 16, 17, 18
See application file for complete search history.

(56) References Cited

U.S. PATENT DOCUMENTS

| 2,347,175 | A | | 4/1944 | Dewey |
| 3,447,694 | A | * | 6/1969 | Hartle ............................. 414/15 |
| 4,413,939 | A | | 11/1983 | Peris |
| 4,507,992 | A | | 4/1985 | Vandevoir et al. |
| 4,624,611 | A | | 11/1986 | Fabbri |
| 4,638,693 | A | | 1/1987 | Sujimoto |
| 4,700,593 | A | | 10/1987 | Cucchi |
| 4,889,024 | A | | 12/1989 | Geiser et al. |
| 4,995,298 | A | * | 2/1991 | Arisaka et al. .................. 82/127 |
| 6,024,002 | A | | 2/2000 | Ravaioli et al. |
| 6,099,226 | A | | 8/2000 | Ito et al. |
| 6,199,461 | B1 | * | 3/2001 | Geiser ............................. 82/124 |
| 6,575,063 | B1 | | 6/2003 | Inaba |
| 6,758,118 | B2 | | 7/2004 | Gellini |
| 7,066,064 | B1 | | 6/2006 | Varady |
| 7,520,200 | B2 | * | 4/2009 | Hirosawa et al. ............... 82/127 |
| 2006/0278052 | A1 | | 12/2006 | Kuo |

FOREIGN PATENT DOCUMENTS

| EP | 214585 A2 | 3/1987 |
| EP | 900626 A1 | 3/1999 |
| GB | 2350656 A | 12/2000 |
| JP | 49-60068 | 6/1974 |
| JP | 58034701 A * | 3/1983 |
| JP | 61-151801 | 9/1986 |
| JP | 62099003 | 5/1987 |
| JP | 63-179002 | 11/1988 |

(Continued)

*Primary Examiner* — Kenneth E. Peterson
*Assistant Examiner* — Jennifer Swinney
(74) *Attorney, Agent, or Firm* — Young & Thompson

(57) ABSTRACT

A feed rod vibration prevention support of a material feeder includes a guide device for guiding a feed rod moving to feed a material to a working machine, and a vibration attenuation mechanism for preventing the feed rod from being vibrated. The guide device further includes a guide and a bush supported by the guide having a feed rod placed thereon. The vibration attenuation mechanism includes a first elastic material located between the bush and the guide. The bush is provided with a flanged portion.

3 Claims, 22 Drawing Sheets

FOREIGN PATENT DOCUMENTS

| | | |
|---|---|---|
| JP | 63-278704 | 11/1988 |
| JP | 63267104 | 11/1988 |
| JP | 63295147 | 12/1988 |
| JP | 1-66901 | 4/1989 |
| JP | 1-153201 | 6/1989 |
| JP | 02053501 A * | 2/1990 |
| JP | 02106202 | 4/1990 |
| JP | 3-43102 | 2/1991 |
| JP | 03-26401 | 3/1991 |
| JP | 5-29601 | 4/1993 |
| JP | 6-190601 | 7/1994 |
| JP | 6-41761 | 11/1994 |
| JP | 08323503 | 12/1996 |
| JP | 11-42502 | 2/1999 |
| JP | 11-320207 | 11/1999 |
| JP | 2000-141102 | 5/2000 |
| JP | 2000-233301 | 8/2000 |
| JP | 2000233301 | 8/2000 |
| JP | 2002-120102 | 4/2002 |
| JP | 2002-307205 | 10/2002 |

* cited by examiner

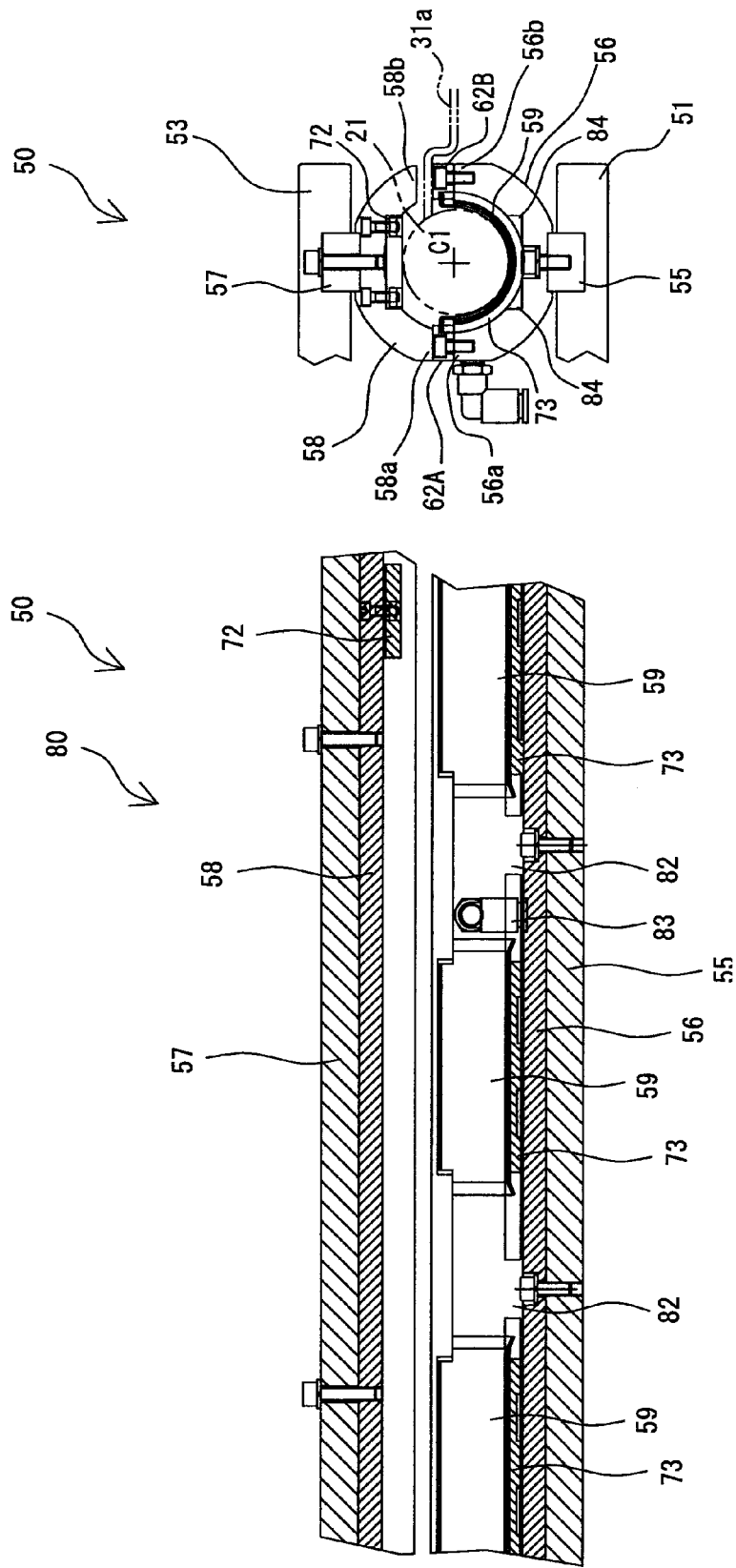
FIG. 5A / FIG. 5B

BAR FEEDER

CROSS-REFERENCE TO RELATED APPLICATIONS

This application is based upon and claims the benefit of priority from Japanese Patent Applications No. 2006-288987 filed on Oct. 24, 2006, No. 2006-290759 filed on Oct. 26, 2006 and No. 2006-296238 filed on Oct. 31, 2006; the entire contents of which are incorporated herein by reference.

BACKGROUND OF THE INVENTION

1. Field of the Invention

The invention relates to a bar feeder for feeding a bar material to a working machine such as lathe, to a feed rod vibration prevention support in a material feeder, and to a vibration stopper of the material feeder.

2. Related Art

A bar feeder of a related art includes a structure having a feed rod passing through a guide pipe in form of a U-groove or cylindrical pipe, or an oil feeder for supplying oil to such guide pipe.

On the other hand, another automatic rod feeder includes an oil feeder having bushes fastened by screws in the U-groove guide at a predetermined interval. This oil feeder includes a bush body and a screw for fixing the bush to a guide pipe.

The guide pipe of the first-mentioned bar feeder, however, has a continuous long-scale structure composed of a metal, a resin or a compound of these metal and resin. In this structure, even if the oil is fed to the guide pipe having a feed rod inserted therein, only a slight gap exists between the feed rod and the inner periphery of the guide pipes. Because of this reason, the oil hardly reaches the feed pipe guide portion, thereby achieving less vibration prevention effect. Where wearing occurred to parts, an entire structure was obliged to be exchanged because the guide pipe has the continuous structure. In the guide pipe of the latter-mentioned rod feeder, on the other hand, when the oil is fed from an oil feed port, the oil is not fed to a space of a next oil reservoir as far as the oil goes over a wall of the bush. When a feed rod is placed on the bush, the space is closed by the feed rod, and accordingly, a slight gap remains between the feed rod and the inner periphery of the bush. Because of this reason, the oil reaches the neighbouring oil reservoir through this slight gap, so that it is difficult for the oil to reach the neighbouring oil reservoir, thereby reducing the vibration prevention effect due to the oil.

Another bar feeder of a related art includes a belt vibration stopper having upper and lower frames vertically opened or closed with two fulcrums being the centers thereof. Such machines or like are required to be adjusted in accordance with a diameter of the material. However, these machines or like are not provided with any mechanism for adjusting an open/close angle of the frames so as to accord with the material diameter. The upper and lower frames must be adjusted independently, which, however, is not easily performed. Especially, in a case where the lower and side surfaces of the upper and lower frames are covered by covers or like, it is predicted to be difficult to adjust the lower frame.

Furthermore, a roller vibration stopper of a related art has upper and lower frames opened or closed with one fulcrum being the center thereof. However, the upper and lower frames are used in the closed state, and this stopper is not provided with any mechanism for adjusting the open/close angle of the upper and lower frames so as to accord with the material diameter.

An oil support of a related art has a mechanism opened or closed vertically. The oil support is, however, not provided with a mechanism for adjusting the open/close angle so as to accord with the material diameter.

A roller vibration stopper of a related art has a frame opened or closed by two cylinders. However, a structure including such two cylinders is complicated and the vibration stopper is firmly fixed to a body.

Another bar feeder feeds a bar from its front end side to the working machine such as lathe while supporting the rear end of the bar material, and the working machine supports the rear portion of the bar material during the working of the front end portion of the bar material.

The bar feeder is provided with a support portion having a U-shaped groove. This support portion is located on the extension of a main shaft of the working machine, and the bar material fed in the U-shaped groove is fed to the main shaft of the working machine by a feed pipe reciprocating in the U-shaped groove.

The bar material is fed into the U-shaped groove from a material rack located on one side of the support portion, and a number of bar materials are arranged in parallel with the U-shaped groove. The bar materials are fed one by one from the material rack to the U-shaped groove of the support portion, and the bar material rolling down from the material rack is received in the U-shaped groove. As mentioned above, when the bar material is fed into the support portion, the feed pipe advances in the U-shaped groove to push the bar material toward the spindle of the working machine. The working machine works the front end of the bar material by repeating clamping and unclamping operations and sequentially cuts and feeds products so that each of them has a predetermined length. After the repeated cutting working, and one bar material is completely worked, a new bar material is fed from the material rack into the U-shaped groove of the support portion, and the like working is repeated.

Further, at the time when the bar material is fed from the material rack into the U-shaped groove of the support portion in the bar feeder, the bar material rolls down into the U-shaped groove, so that an impact, noise or like may be caused by the collision of the bar material with the support portion.

For example, in a case where the bar material is erroneously fed into the U-shaped groove by a miss-operation of an operator, it is extremely difficult to take out the bar material from the U-shaped groove. This difficulty will be increased in a case the diameter of the bar material becomes near the width of the U-shaped groove.

One end of the U-shaped groove of the support portion is opened, and accordingly, the bar material is easily come off from this open end of the U-shaped groove during the working of the bar material.

SUMMARY OF THE INVENTION

The invention is directed to a feed rod vibration prevention support in a bar feeder improved in vibration prevention performance of the feed rod.

The invention is directed to a vibration stopper of a bar feeder for achieving appropriate vibration prevention performance in accordance with a size of the bar material. The invention is directed to a bar feeder holding a bar material in a U-shaped groove during the working thereof.

The first aspect of the invention provides a feed rod vibration prevention support of a material feeder. The support includes a guide device for guiding a feed rod moving to feed a material to a working machine. The support includes a vibration attenuation mechanism for preventing the feed rod from being vibrated. The guide device includes a guide; and a bush supported by the guide having the feed rod placed thereon and including a flanged portion. The vibration attenuation mechanism includes a first elastic material located between the bush and the guide.

The support may include a base supporting the guide device. The vibration attenuation mechanism may include a second elastic material located between the base and the guide device.

The second aspect of the invention provides a feed rod vibration prevention support of a material feeder. The support includes a guide device for guiding a feed rod moving to feed a material to a working machine. The support includes a fluid supply system for allowing a fluid to flow through the feed rod and the guide device. The guide device includes a guide, a bush supported by the guide and having a feed rod placed thereon, and an elastic material located between the bush and the guide. The fluid supply system includes a first and second fluid reservoirs having the guide device located therebetween, and a fluid path located between the guide and the elastic material and extending between the first and second fluid reservoirs.

The third aspect of the invention provides a vibration stopper of a material feeder. The stopper includes first and second roller members relatively rotatable to hold a material therebetween. The stopper includes a stopper extending between the first and second roller members and being movable to set an angle between the first and second roller members holding the material therebetween. The stopper includes an adjusting mechanism for displacing the stopper to adjust the angle.

The fourth aspect of the invention provides a vibration stopper of a material feeder. The stopper includes first and second roller members relatively rotatable to hold a material therebetween. The stopper includes a cylinder movable to set an angle between the first and second roller members. The stopper includes an adjusting mechanism for displacing the cylinder to adjust the angle.

The vibration stopper may include a fulcrum shaft supporting the first and second roller members to be relatively rotatable. The fulcrum shaft may support an upper lid, to be rotatable, of the support portion supporting the material.

At least one of the first and second roller members may include a roller displaceable in a radial direction.

The fifth aspect of the invention provides a bar feeder. The feeder includes a support portion provided with a U-shaped groove located on an extension of a spindle of a working machine. The feeder includes a material rack supporting a bar material in parallel with the U-shaped groove of the support portion, the bar material being to be fed to the U-shaped groove of the support portion. The feeder includes a feed pipe for pushing out the bar material toward the spindle, the bar material being fed in the U-shaped groove from the material rack. The feeder includes a guide lever reciprocating in a direction crossing between a groove opening side and a groove bottom side of the U-shaped groove. The guide lever is controlled to move from the groove bottom side to the groove opening side to push out the material toward the groove opening side upon returning of the bar material to the material rack from the U-shaped groove.

The sixth aspect of the invention provides a bar feeder. The feeder includes a support portion provided with a U-shaped groove located on an extension of a spindle of a working machine. The feeder includes a material rack supporting a bar material in parallel with the U-shaped groove of the support portion, the bar material being to be fed to the U-shaped groove of the support portion. The feeder includes a feed pipe for pushing out the bar material toward the spindle, the bar material being fed in the U-shaped groove from the material rack. The feeder includes a guide lever reciprocating in the U-shaped groove in a direction crossing between a groove opening side and a groove bottom side of the U-shaped groove. The guide lever is controlled to receive the bar material on the groove opening side to move toward the groove bottom side upon supplying of the bar material into the U-shaped groove from the material rack.

The seventh aspect of the invention provides a bar feeder. The feeder includes a support portion provided with a U-shaped groove located on an extension of a spindle of a working machine. The feeder includes a material rack supporting a bar material in parallel with the U-shaped groove of the support portion, the bar material being to fed to the U-shaped groove of the support portion. The feeder includes a feed pipe for pushing out the bar material toward the spindle, the bar material being fed in the U-shaped groove from the material rack. The feeder includes a guide lever reciprocating in the U-shaped groove in a direction crossing between a groove opening side and a groove bottom side of the U-shaped groove. The guide lever is controlled to receive the bar material on the groove opening side to move toward the groove bottom side upon supplying of the bar material into the U-shaped groove from the material rack, and the guide lever being controlled to move from the groove bottom side toward the groove opening side to push out the bar material on the groove opening side upon returning of the bar material to the material rack from the U-shaped groove.

The support portion may include an upper support section for opening and closing the U-shaped groove of the support portion from the groove opening side. The upper support section may be cooperated with the guide lever in a manner such that when the guide lever receives the bar material on the groove opening side to move toward the groove bottom side, the upper support section closes the U-shaped groove, and when the guide lever is moved from the groove bottom side toward the groove opening side, the upper support section opens the U-shaped groove.

The upper support section and the guide lever may be integrated by a common support shaft and may be movable by a common actuator.

The eighth aspect of the invention provides a bar feeder. The bar feeder includes a support portion provided with a U-shaped groove located on an extension of a spindle of a working machine. The feeder includes a material rack supporting a bar material in parallel with the U-shaped groove of the support portion, the bar material being to be fed to the U-shaped groove of the support portion. The bar feeder includes a feed pipe for pushing out the bar material toward the spindle, the bar material being fed in the U-shaped groove from the material rack. The bar feeder includes a guide lever reciprocating in a direction crossing between a groove opening side and a groove bottom side of the U-shaped groove. The guide lever is controlled to move from the groove bottom side to the groove opening side to push out the material toward the groove opening side upon returning of the bar material to the material rack from the U-shaped groove. The bar feeder further includes a feed rod vibration prevention support. The support includes a guide device for guiding a feed rod moving to feed a bar material to a working machine.

The support includes a vibration attenuation mechanism for preventing the feed rod from being vibrated. The guide device includes a guide; and a bush supported by the guide having a feed rod placed thereon and including a flanged portion. The vibration attenuation mechanism includes a first elastic material located between the bush and the guide.

The bar feeder further includes a vibration stopper. The stopper includes first and second roller members relatively rotatable to hold a bar material therebetween. The stopper includes a stopper extending between the first and second roller members and being movable to set an angle between the first and second roller members holding the bar material therebetween. The stopper includes an adjusting mechanism for displacing the stopper to adjust the angle.

The nature and further characteristic features of the invention will be made clearer from the following descriptions made with reference to the accompanying drawings.

BRIEF DESCRIPTION OF THE ACCOMPANYING DRAWINGS

In the accompanying drawings:

FIG. 5A is a longitudinal section of a guide device, and FIG. 5B is a side of the guide device;

DETAILED DESCRIPTION OF THE PREFERRED EMBODIMENTS

Hereunder, best modes for embodying the invention will be described with reference to the accompanying drawings, in which terms of "upper", "lower", "right", "left" and the like terms are used with reference to the illustrations of the drawings or in an actually installed state of an apparatus or like.

First Embodiment

Figure 1:
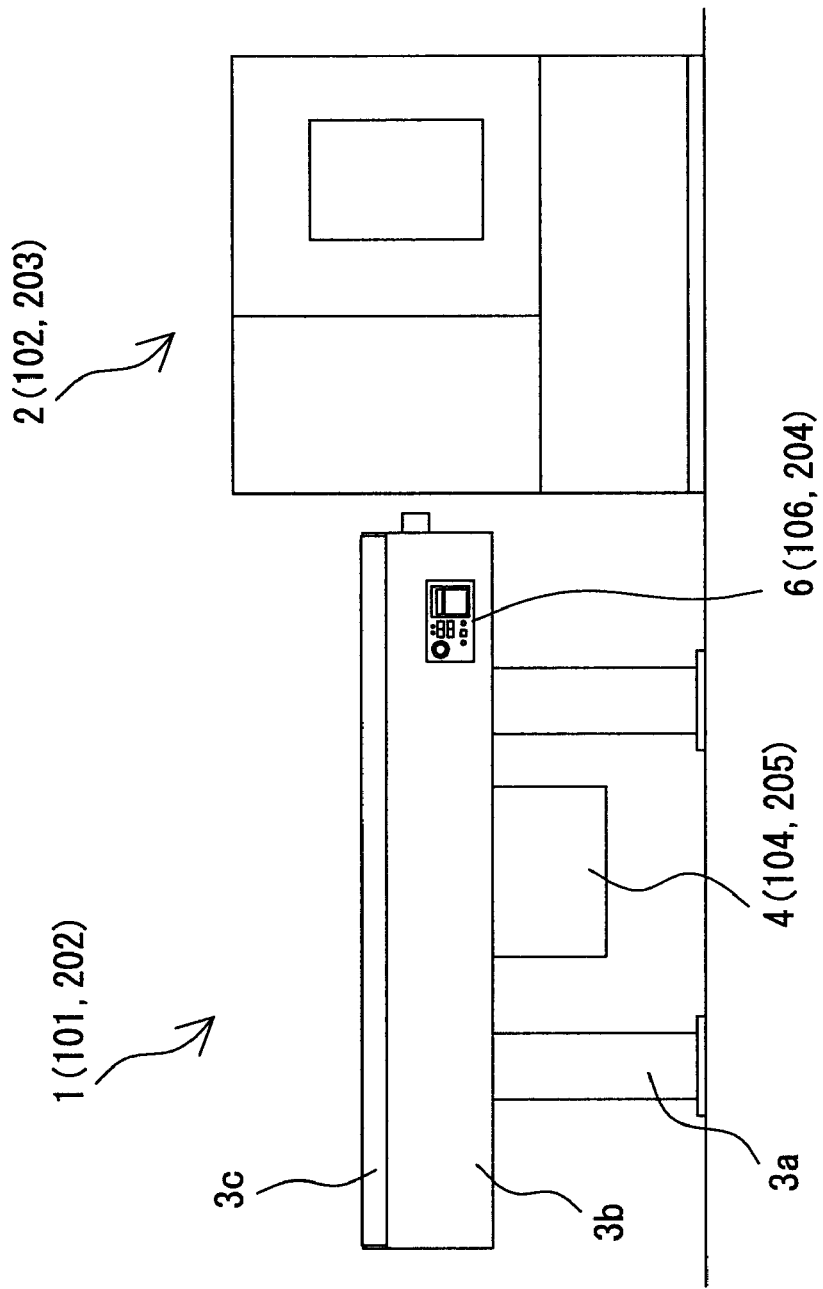
FIG. 1 is a front view illustrating a bar feeder and a lathe according to a first embodiment of the invention.
Figure 2:
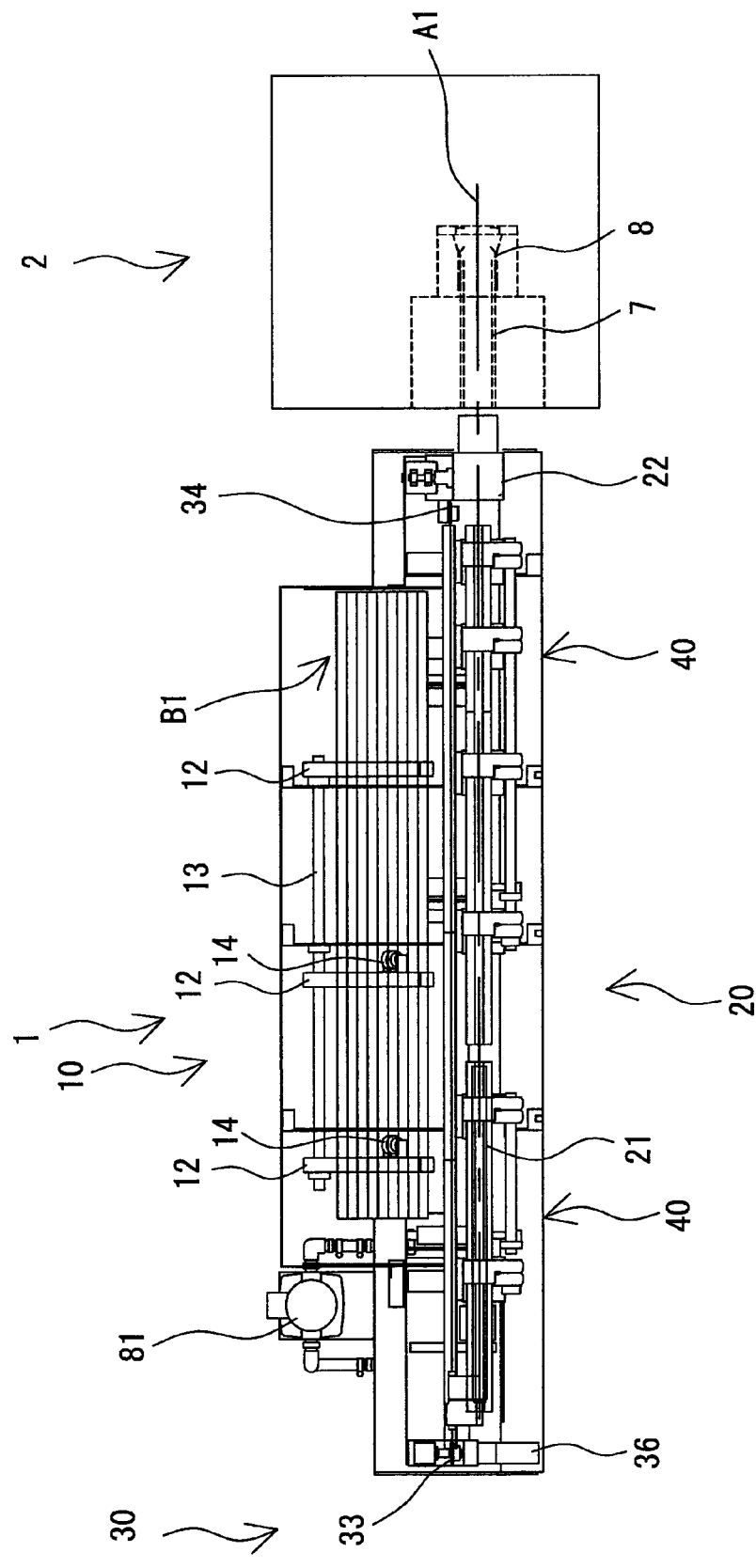
FIG. 2 is a plan view illustrating an inner structure of the bar feeder and the lathe illustrated in FIG. 1.

With reference to FIG. 1, a bar feeder 1 as a material feeder is located adjacent to a lathe 2 as a working machine. The bar feeder 1 includes a feeder body 3b supported by a base 3a. The bar feeder 1 includes an upper lid 3c assembled with the feeder body 3b. The bar feeder 1 further includes a control box 4 located below the feeder body 3b and an operation board 6 located in front of the feeder body 3b. With reference to FIG. 2, the lathe 2 is provided with a cylindrical spindle (main shaft) 7 through which a bar material B1 may pass, and the lathe 2 is also provided, at the end of the spindle 7, with a chuck 8 for grasping the bar material B1. The chuck 8 is linearly moved together with the spindle 7 and is rotatable around an axis A1 of the spindle 7. The lathe 2 has a blade for cutting the front end of the bar material B1. The spindle 7 may be a stationary type which is not linearly movable.

Further, with reference to FIG. 2, the bar feeder 1 includes a material rack 10 for stocking the bar materials B1. The bar feeder 1 includes a conveyer 30 and a support device 20 for receiving the bar material B1 from the material rack 10 to convey it to the lathe 2. The material rack 10, the conveyer 30 and the support device 20 are controlled by the control box 4.

Figure 3:
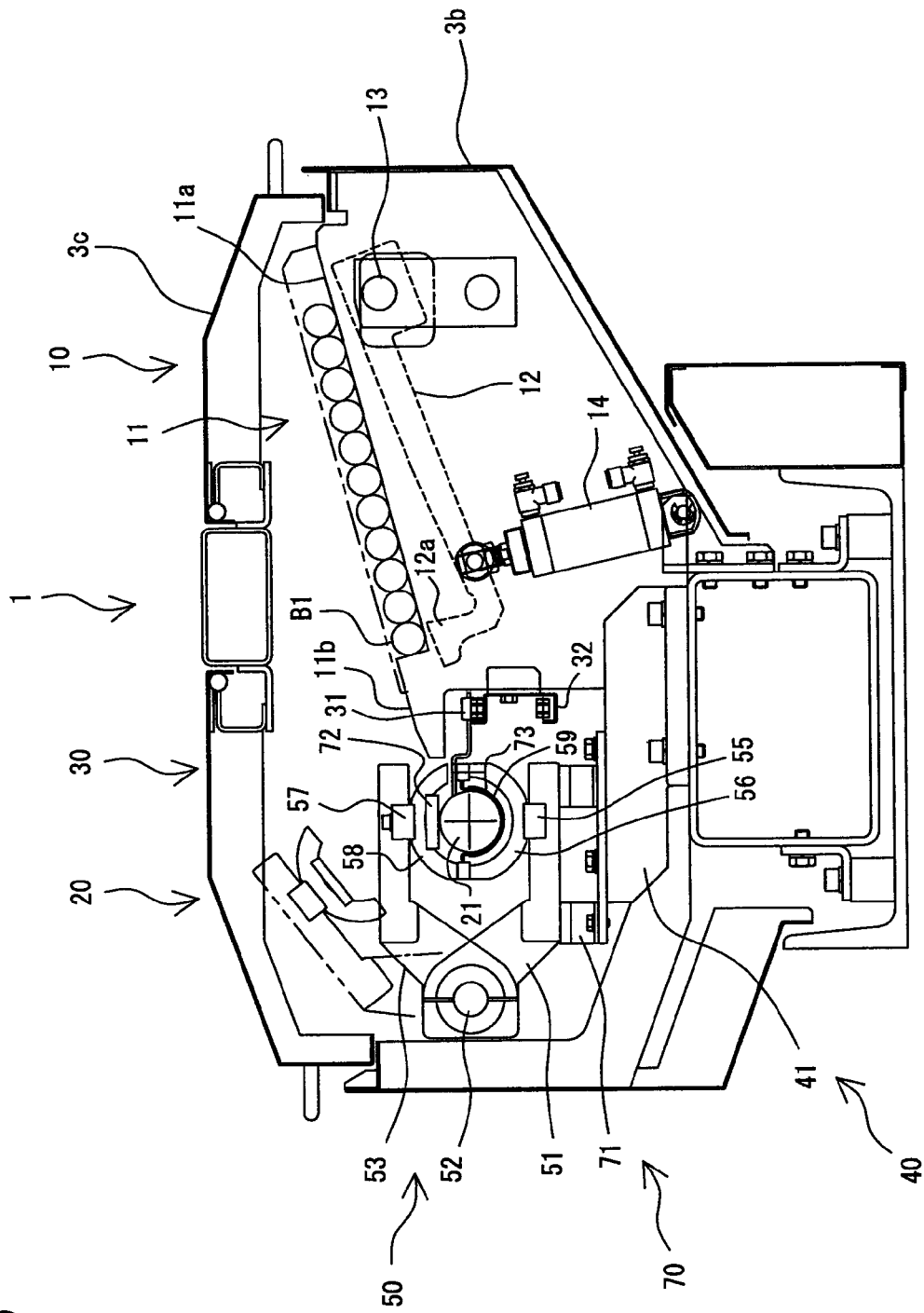
FIG. 3 is a side view of the bar feeder illustrated in FIG. 1.

Next, with reference to FIG. 3, the material rack 10 includes an inclined rack member 11 having a recess 11a in which the bar materials B1 are parallelly arranged. The material rack 10 includes an L-shaped take-out lever 12 which is rotatable with a rotation shaft 13 being a fulcrum thereof so as to raise the bar material B1 from the lower side thereof. The material rack 10 also includes a cylinder 14 for driving the take-out lever 12, the cylinder 14 being swingably supported by the feeder body 3b. When the cylinder 14 is operated, the take-out lever 12 is rotated in the clockwise direction, the leading (front one) bar material B1 is raised upward by the front end of the take-out lever 12, and then, the leading bar material B1 is taken out. The taken-out bar material B1 moves toward the support device 20 along the inclined surface 11b of the rack member 11.

Figure 4:
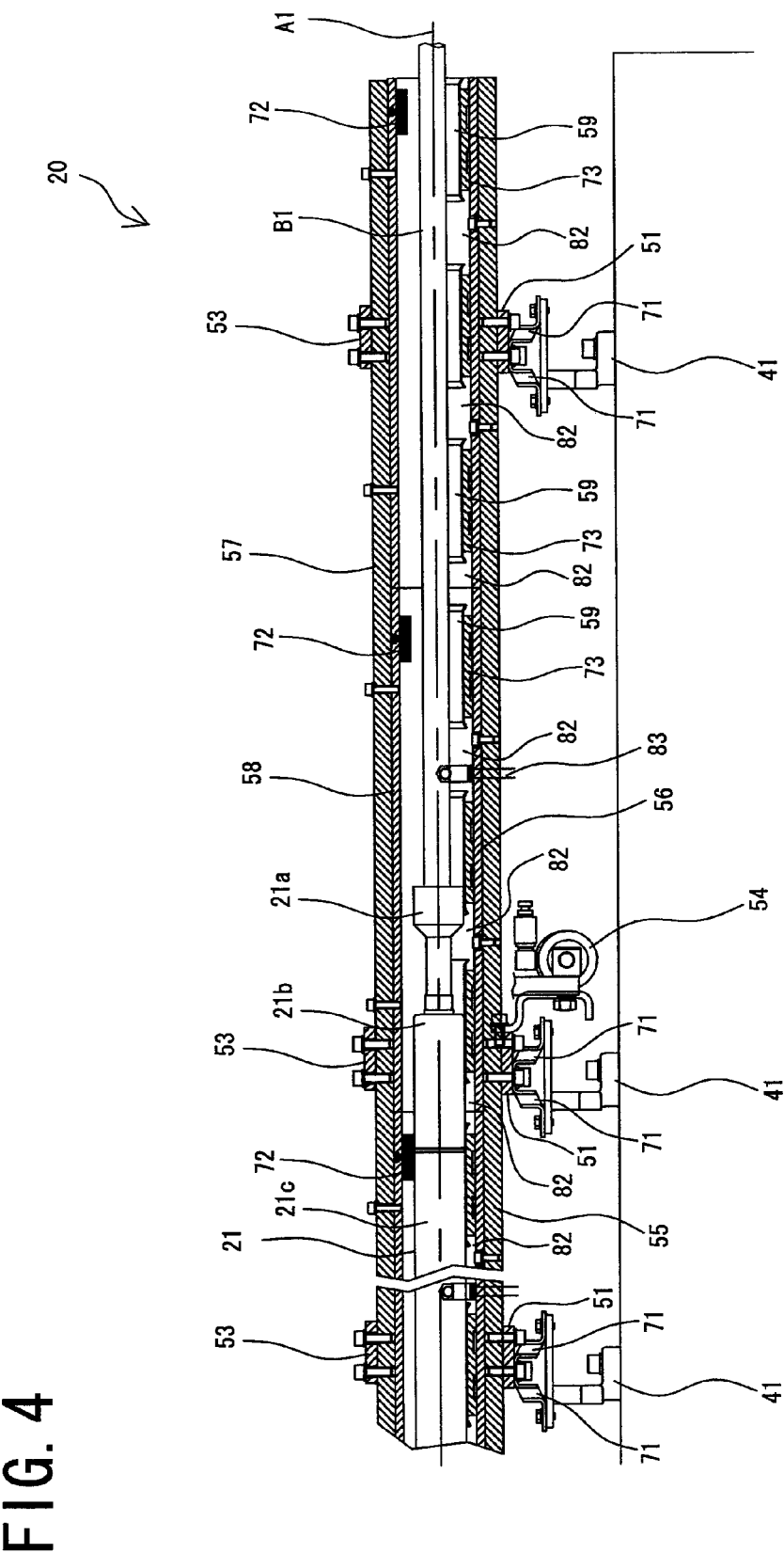
FIG. 4 is a longitudinal section of a support illustrated in FIG. 2.

With reference to FIGS. 2 and 4, the conveyer 30 includes a feed rod 21 centered to the axis A1 of the spindle 7. The feed rod 21 includes a finger chuck 21a for grasping the rear end of the bar material B1. The finger rod 21 includes a bearing 21b supporting the finger chuck 21a to be rotatable. The finger rod 21 includes a push rod 21c fixing the bearing 21b. The conveyer 30 includes, at its front end opposing to the lathe 2, a vibration stopper 22. The vibration stopper 22 stops the vibration of the rotating bar material B1, thereby preventing the vibration from transferring to the feed rod 21 from the bar material B1 rotating.

With reference to FIGS. 2 and 3, the conveyer 30 includes a feed motor 36 driving the feed rod 21 and a slider 31 fixed to the front and rear positions of the feed rod 21. The conveyer 30 also includes a slider guide 32 which is located along the axis A1 of the spindle 7, fixed to the rack member 11 and engaged with the slider 31. The conveyer 30 is provided with a driving sprocket 33 and a front sprocket 34 stretched with a driving chain connected to one of the slides 31. When the feed motor 36 is driven, the driving sprocket 33 is rotated. The rotating driving sprocket 33 serves to travel the driving chain via the front sprocket 34 so as to move forward or rearward the feed rod 21 connected to the slider 31 using a coupling member 31a together with the slider 31.

As illustrated in FIG. 3, the support device 20 includes a support mechanism 40 supporting the feed rod 21 and also includes a guide device 50 for guiding the feed rod 21.

The support mechanism 40 includes mount stays 41 as a base arranged at a predetermined interval along the axis A1 of the lathe 2.

The guide device 50 includes a lower support stay 51 supported by the mount stay 41 with a vibration-proof rubber 71 intervening between the lower support stay 1 and the mount stay 41. The guide device 50 includes an upper support arm 53 coupled with the lower support stay 51 to be rotatable by using a fulcrum shaft 52. The guide device 50 also includes a cylinder 54 (see FIG. 4) driving the upper support arm 53.

The guide device 50 also includes a U-shaped lower support guide 56 connected to the lower support stay 51 by means of a lower coupling rail 55. The guide device 50 includes an upper support guide 58 connected to the upper support arm 53 by means of upper coupling rail 57. The guide device 50 further includes a support case 59 as a bush positioned inside the lower support guide 56. The guide device 50 includes a U-shaped vibration-proof rubber 53 interposed between the lower support guide 56 and the support case 59. The guide device 50 includes a vibration-proof pad 72 fixed to the upper support guide 58 of the guide device 50.

With reference to FIG. 5B, the upper support guide 58 has an end 58a of in the circumferential direction opposed, with a gap, to the end 56a of the lower support guide 56 in the circumferential direction. The coupling member 31a is inserted in the gap so as to couple the feed rod 21 and the slider 31.

Figure 6B:
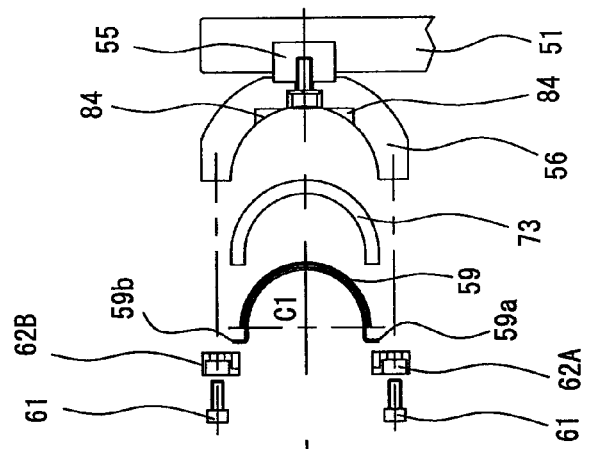
FIG. 6B is a side view illustrating the lower portion thereof.
Figure 6A:
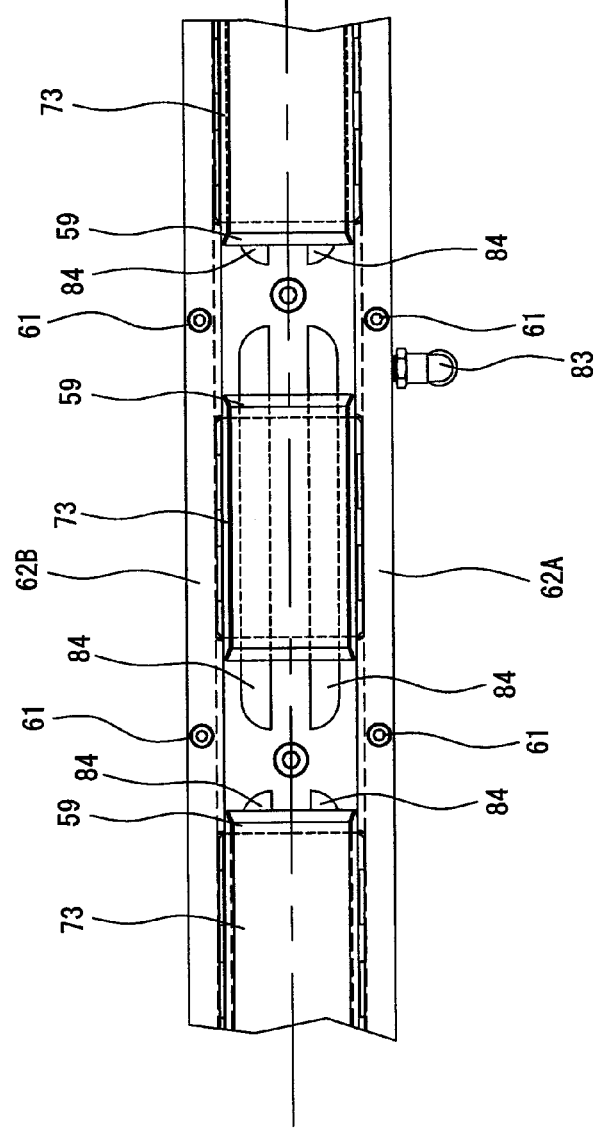
FIG. 6A is a plan view illustrating a lower portion of the guide device.

A thin metal support case 59 is curved so as to conform with the inner peripheral surface of the vibration-proof rubber 73. The outer peripheral surface of the vibration-proof rubber 73 is curved so as to conform with the inner peripheral surface of the lower support guide 56. The support case 59 has a U-shaped groove in its inside, in which the feed rod 21 is located. The support case 59 has both circumferential ends which extend upward form a center line C1 and are bent outward, thereby constituting flanged portions 59a and 59b (see FIG. 6). The "center line C1" means a line passing the center of a curvature circle of the inner surface of the support case 59. The flanged portions 59a and 59b are fastened to both the end portions of the lower support guide 56 together with presser fittings 62A and 62B by using screws 61. The support case 59 and the vibration-proof rubber 73 are located at a predetermined interval along the axis A1. The support case 59 and the vibration-proof rubber 73 may be exchanged in accordance with the size of the feed rod 21 and independently so as to correspond to partial wearing.

As illustrated in FIG. 3, the support device 20 includes a vibration attenuation mechanism 70 for preventing the vibration of the feed rod 21. The vibration attenuation mechanism 70 is provided with a vibration-proof rubber 71 located between a mount stay 41 and a lower support stay 51. A plurality of the vibration attenuation mechanisms 70 are arranged at a predetermined interval along the axis A1 and provided with vibration-proof pads 72 made of a urethane rubber as illustrated in FIG. 4. Each of the vibration-proof pads 42 is fixed inside the upper support guide 58 by means of screw as illustrated in FIG. 5B. The vibration-proof pad 72 defines a space conforming with the size of the feed rod 21 together with the inner surface of the support case 59 so as to block the upward movement of the feed rod 21. Although, in the illustrated embodiment, the vibration-proof pad 72 has a square section, it may have a semi-circular section in conformity with the diameter of the feed rod 21. The vibration attenuation mechanism 70 includes a U-shaped vibration-proof rubber 73 as an elastic member located between the support case 59 and the lower support guide 56. The vibration-proof rubber may be exchanged independently so as to deal with a problem of partial wearing.

With reference to FIG. 5A, the support device 20 includes an oil supply system 80 as a fluid supply system for supplying an oil as fluid to the guide device 50. The oil supply system 80 includes an oil pump 81 for feeding the oil (see FIG. 2). The oil supply system 80 is provided with an oil reservoir space 82 as fluid reservoir between the guide devices 50. The oil supply system 80 includes an oil supply port 83 connected to the oil pump 81 using a duct for supplying the oil to the oil reservoir space 82. The oil supply system 80 includes an oil path 84 as a fluid path formed by cutting out the bottom portion of the lower support guide 56. The oil path 84 connects the oil reservoir spaces 82 to each other. This oil path 84 allows the oil to communicate between the respective oil reservoir spaces 82, so that the oil is uniformly distributed to the respective oil reservoir spaces 82, thereby achieving the vibration prevention effect.

Next, the operation of the bar feeder 1 will be described hereunder.

With reference to FIG. 3, the upper support arm 53 is rotated in the counter-clockwise direction with respect to the lower support stay 51 to thereby separate the upper support guide 58 from the lower support guide 56, releasing the upper side of the support case.

The cylinder 14 is then operated to rotate the take-out lever 12 in the clockwise direction. The front end 12a of the take-out lever 12 lifts upward the leading bar material B1 and takes it out through the recess 11a. The taken out bar material B1 descends the inclining surface 11b of the rack 11 and falls inside the support case 59.

Then, the upper support arm 53 is rotated in the clockwise direction with respect to the lower support stay 51 so that the upper support guide 58 approaches the lower support guide 56. Accordingly, the upper support guide 58 is positioned with respect to the lower support guide 56, locating the vibration-proof pad 72 with the gap between it 58 and the top portion of the feed rod 21.

Next, the feed motor 36 is operated to move the slider 31 toward the lathe 2 along the slider guide 32. This operation allows the feed rod 21 to move toward the lathe 2 along the axis A1. With reference to FIG. 4, the feed rod 21 is temporarily stopped in front of the bar material B1 and the rear end of the bar material B1 is grasped by the finger chuck 21a. The feed rod 21 is again moved together with the bar material B1 toward the lathe 2 along the axis A1, being inserted into the spindle 7 of the lathe 2 as illustrated in FIG. 2.

The vibration-proof rubber 71 absorbs the vibration of the guide device 50. The vibration-proof pad 72 and the vibration-proof rubber 73 absorb the vibration of the feed rod 21, thus preventing the feed rod 21 form vibrating.

The oil pump 81 serves to supply the oil from the oil support port 83 into the oil reservoir space 82. The oil lubricates the feed rod 21 and the guide device 50 and flows between the adjacent oil reservoir spaces 82 through the oil path 84 so as to be uniformly distributed therein, thus achieving and improving the vibration-proof performance.

The bar material B1 passes through the spindle 7 of the lathe 2 to be fixed by means of the chuck 8. The bar material B1 is then worked by a blade provided for the lathe 2. After the completion of the working, the remaining portion of the bar material B1 is moved backward to the bar feeder 1 from the lathe 2 in accordance with the backward movement of the feed rod 21.

According to the bar feeder 1 of the structure mentioned above, the vibration-proof rubber 71 of the vibration attenuation mechanism 70 absorbs the vibration of the guide device 50, and the vibration-proof pad 72 and the vibration-proof rubber 73 absorb the vibration of the feed rod 21, and accordingly, the vibration of the feed rod 21 is prevented.

The oil path 84 allows the oil to flow between the neighbouring oil reservoir spaces 82, so that the oil is uniformly distributed in the oil reservoir spaces 82 and the vibration-proof effect is improved.

Second Embodiment

Figure 7:
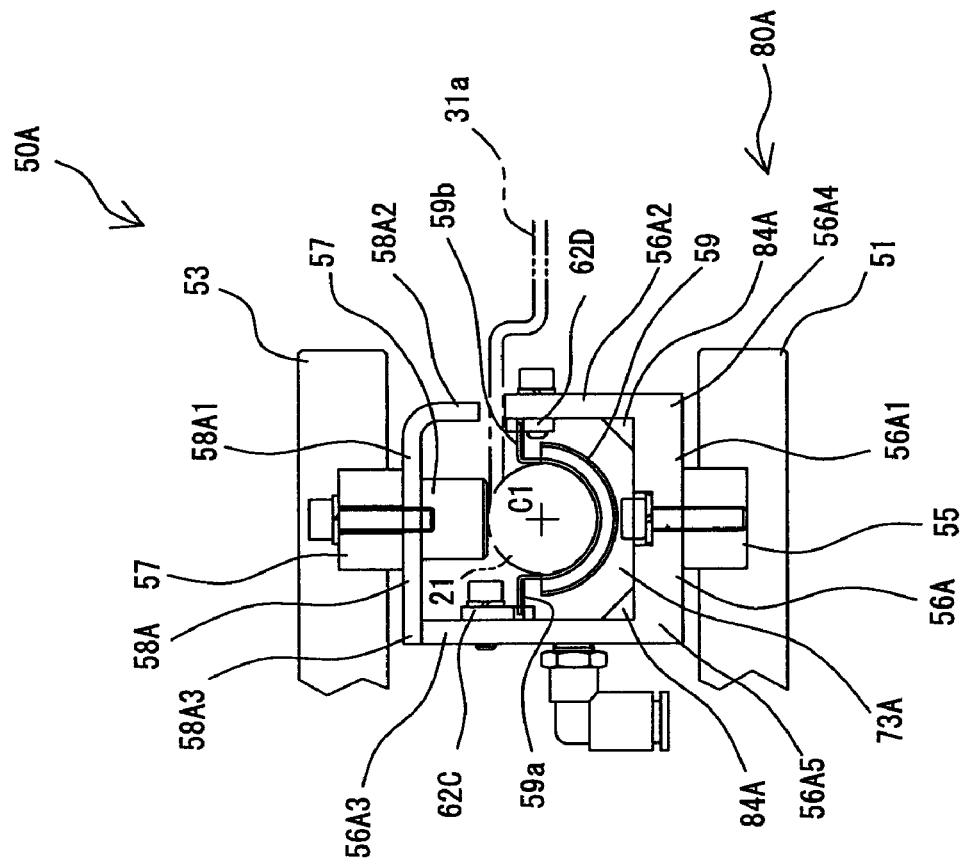
FIG. 7 is a side view illustrating the guide device of the bar feeder according to a second embodiment of the invention.

The bar feeder 1 according to the second embodiment will be described hereunder with reference to FIG. 7.

The bar feeder 1 includes a guide device 50A which has a characteristic feature of the invention. The guide device 50A includes a J-shaped lower support guide 56A. The lower support guide 56A is composed of a bottom wall section 56A1, a first side wall section 56A2 extending at right angle from one end of the bottom wall section 56A1, and a second side wall section 56A3 extending at right angle from the other end of the bottom wall section 56A1. The second side wall section 56A3 has a length longer than that of the first side wall section 56A2. The lower support guide 56 is provided with a right-angled corner members 56A4 and 56A5 constituted by the bottom wall section 56A1 and the first and second side wall sections 56A2 and 56A3. The guide device 50A includes an L-shaped upper support guide 58A in combination with the lower support guide 56. The upper support guide 58A includes a top wall section 58A1 extending in parallel with the bottom wall section 56A1. The upper support guide 58A includes a side wall section extending at right angle from one end of the top wall section 58A1. The side wall section 58A2 is located so as to oppose to the first side wall section 56A2 with a gap therebetween. The top wall section 58A1 has the other end 58A3 contacting the second wall section 56A3 of the lower support guide 56A.

The guide device 50A includes press fitting members 62C and 62D into which flanged portions 59a and 59b of the support case 59 are inserted and which are fixed to the inner surfaces of the first and second side wall sections 56A2 and 56A3, respectively.

The guide device 50A also includes a vibration-proof rubber 73A located between the support case 59 and the lower support guide 56A. The vibration-proof rubber 73A having a rectangular cross section is provided with an oil path 84A as a fluid path formed by cutting out corner portions corresponding to corner portions 56A4 and 56A5 of the lower support guide 56A. The oil path 84A constitutes a fluid supply system 80A.

According to the bar feeder 1 of the structures mentioned above, substantially the identical benefits and functions as those of the first embodiment will be achieved.

Third Embodiment

Figure 8:
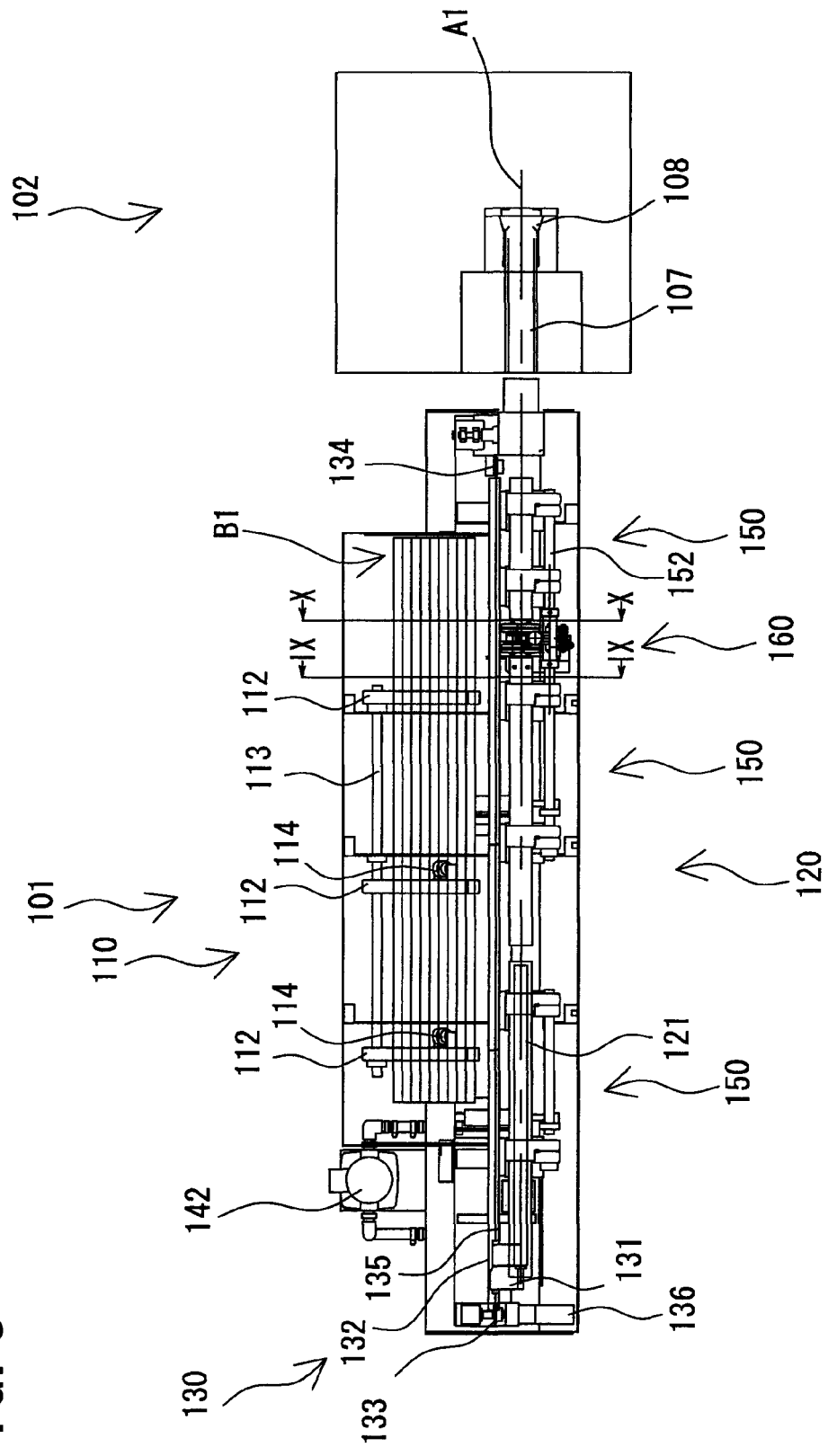
FIG. 8 is a plan view of the bar feeder and the lathe according to a third embodiment of the invention.
Figure 9:
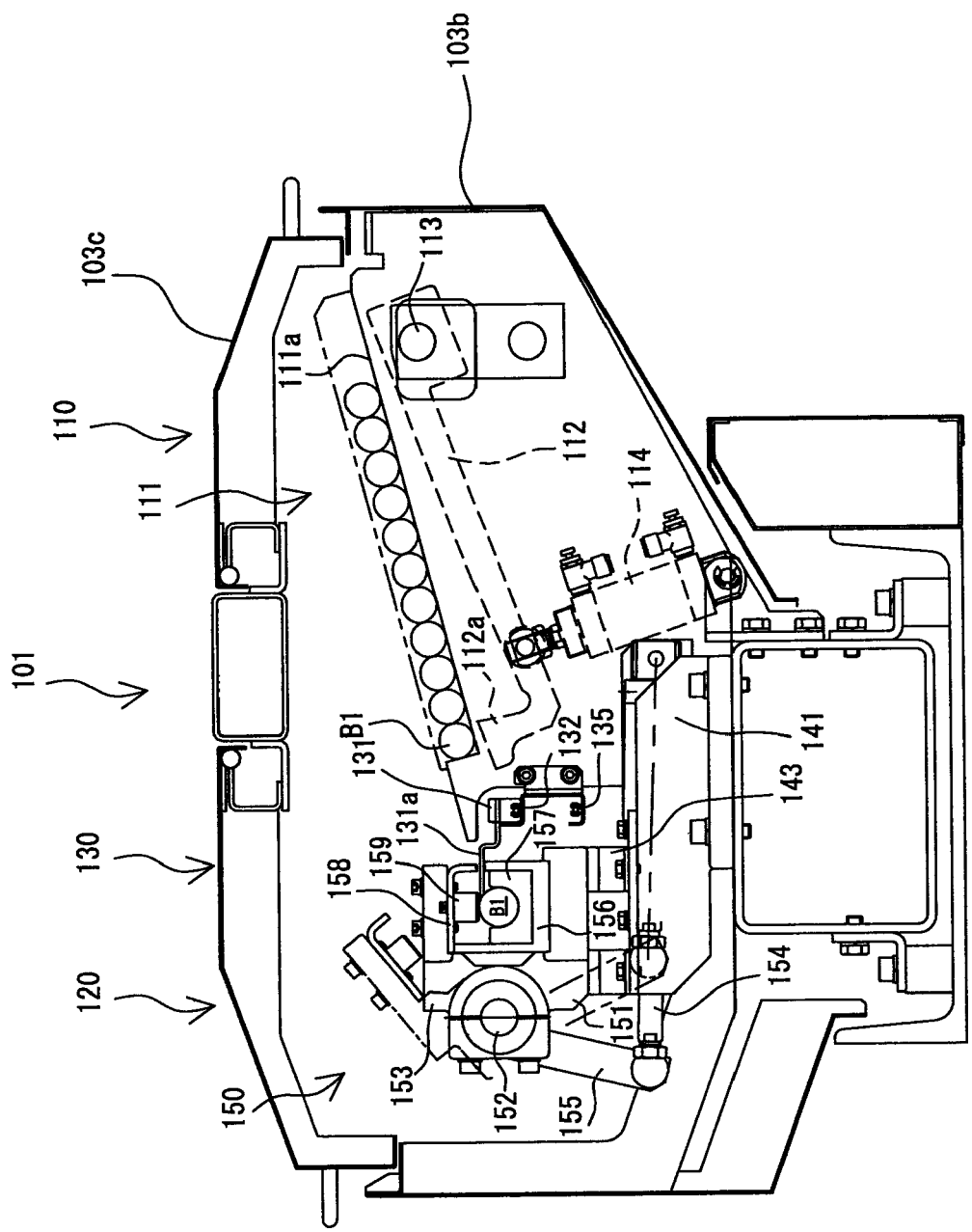
FIG. 9 is a transverse sectional view of the bar feeder taken along the line IX-IX in FIG. 8.

With reference to FIGS. 8 and 9, a bar feeder 101 as a material feeder is located in adjacent to a lathe 102 as a working machine. The bar feeder 101 includes a feeder body 103b supported by a base 103a. The bar feeder 101 includes an upper lid 103c assembled with the feeder body 103b. The bar feeder 101 includes a control box 104 located below the feeder body 103b. The bar feeder 101 includes an operation board 106 located at the front side portion of the feeder body 103b. With reference to FIG. 8, the lathe 102 includes a cylindrical spindle 107 through which the bar material B1 passes. The lathe 102 also includes, at the end of the spindle 107, a chuck 108 for grasping the bar material B1. The chuck 108 is linearly movable with the spindle 107 and rotatable about the axis A1 thereof. The lathe 102 further includes a blade for working the front end of the bar material B1. A stationary type spindle may be adopted instead of the movable type.

As illustrated in FIG. 8, the bar feeder 101 includes a material rack 110 for stocking the bar materials B1. The bar feeder 101 includes a support device 120 for receiving the bar materials B1 from the rack 110. The bar feeder 101 includes a conveyer 130 conveying the bar materials B1 on the support device 120 to the lathe 102. The bar feeder 101 includes a vibration stopper 160 for preventing the vibration of the bar materials B1 on the support device 120. The material rack 110, the support device 120, the conveyer 130 and the vibration stopper 160 are controlled by the control box 104 illustrated in FIG. 1.

With reference to FIG. 9, the material rack 110 includes an inclined rack 111 having a recess 111a, in which the bar materials B1 are mounted parallelly. The material rack 110 also includes an L-shaped take-out lever 112 rotatable about a rotating shaft 113 as a fulcrum so as to lift upward the bar material B1 from the lower side thereof. The take-out lever 112 is driven by a cylinder 114 of the material rack 110. The cylinder 114 is swingably supported by the feeder body 103b. When the cylinder 114 is driven to rotate the lever 112 in the clockwise direction, the leading bar material B1 is raised by the front end 112a of the take-out lever 112 to be taken out of the recess 111a. The bar material B1 moves toward the support device 112 along the inclined surface of the rack 111.

With reference to FIGS. 8 and 9, the conveyer 130 includes a feed rod 121 centered to the axis A1 of the spindle 107. The feed rod 121 includes a finger chuck grasping a rear end of the bar material B1. The feed rod 121 includes a bearing rotatably supporting the finger chuck. The feed rod 121 includes a push rod to which the bearing is fixed.

The conveyer 130 also includes a feed motor 136 for driving the feed rod 121. The conveyer 130 includes a slider 131 fixed to the front and rear portions of the feed rod 121. The conveyer 130 includes a slider guide 132 located along the axis A1, fixed to the rack 111 and engaged with the slider 131. The conveyer 130 further includes a driving sprocket 133 and a front end side sprocket 134 to which a drive chain 135 connected to one of the sliders 131 is stretched and engaged. The feed motor 136 is operated to rotate the driving sprocket 133. The rotating sprocket 133 travels the drive chain 135 by way of the front end side sprocket 134 so as to move forward or backward the feed rod 121 coupled with the sliders 131 by means of coupling fittings 131a together with the sliders 131.

The support device 120 includes mount stays 141 as a base arranged along the axis A1 at a predetermined interval. The support device 120 includes support members 150 supported by the mount stays 141. The support device 120 includes an oil pump 142 (FIG. 8) for supplying the oil to the support members 150.

With reference to FIG. 9, the support member 150 includes a lower support holder 151 supported by the mount stay 141 with a vibration-proof rubber 143 therebetween. The support member 150 includes an upper support holder 153 connected to the lower support holder 151 to be rotatable with respect to the lower support holder 151 by using a guide bar 152 acting as fulcrum. The support member 150 includes a cylinder 154 for opening or closing the upper support holder 153 by using a open/close lever 155.

The support member 150 also includes a J-shaped support case 156 located on the lower support holder 151. The support member 150 includes a U-shaped support 157 positioned inside the support case 156 for arranging the bar material B1. The support member 150 includes a vibration-proof pad 159 formed of a urethane rubber and fixed to the lower surface of the upper lid 158. The one end in the circumferential direction of the upper lid 158 contacts one end in the circumferential direction of the lower support holder 151. The other end in the circumferential direction of the upper lid 158 opposes to the other end of the lower support holder 151 with a gap therebetween. The coupling fitting 131a is inserted into this gap so as to connect the feed rod 121 and the slider 131.

The support 157 made of metal or resin has a U-shaped groove therein, in which the bar material B1 is located. The inner peripheral surface of the support 157 is curved in conformity with the outer peripheral surface of the feed rod 121. This support 157 may be exchanged independently because of partial wearing thereof.

Figure 10:
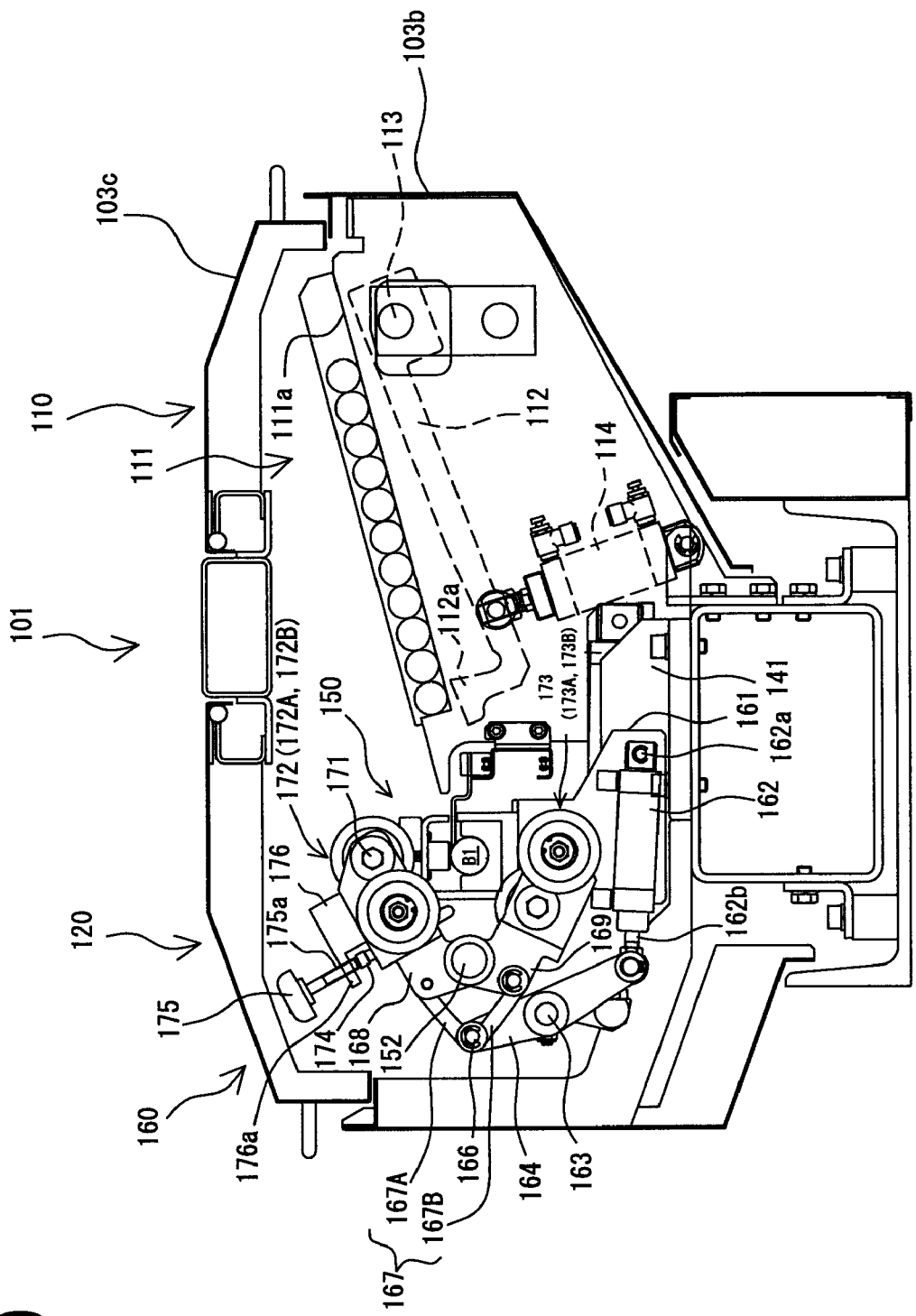
FIG. 10 is a transverse sectional view of the bar feeder taken along the line X-X in FIG. 8.
Figure 11A:
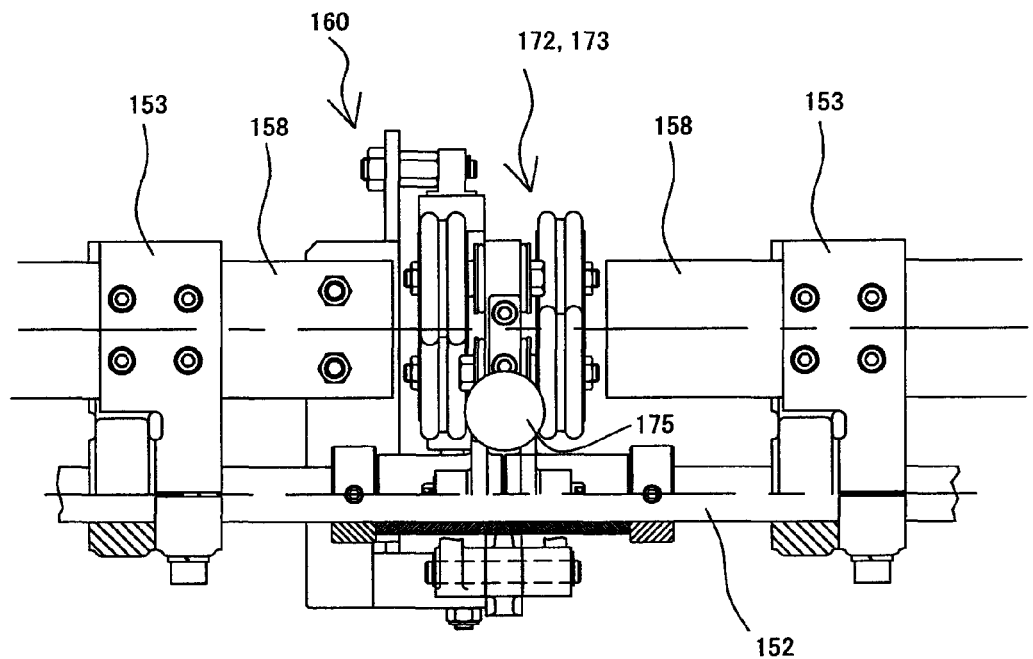
FIG. 11A is a top plan view, in an enlarged scale, of a support portion and a vibration stopper.
Figure 11B:
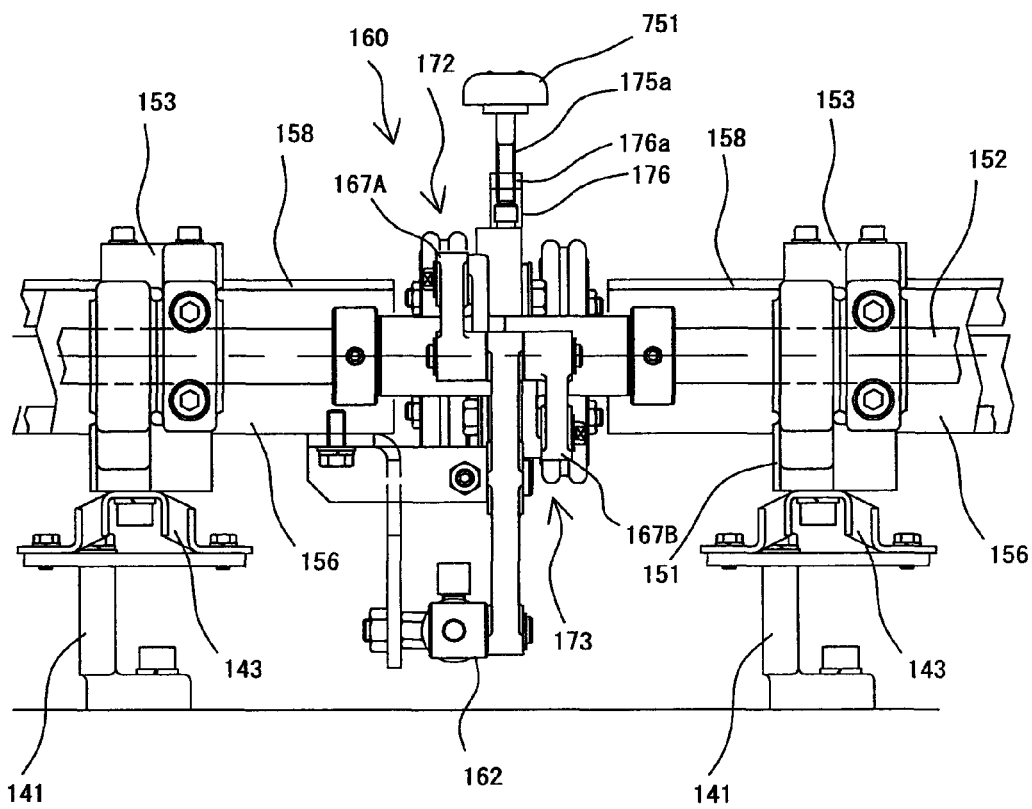
FIG. 11B is a side view thereof.

With reference to FIG. 10, the vibration stopper 160 includes an open/close cylinder 162 fixed to a cylinder mount plate 161. The vibration stopper 160 also includes a first open/close lever 164 rotatably supported by the open/close cylinder 162 about a first fulcrum shaft 163 fixed to the cylinder mount plate 161. The vibration stopper 160 includes a second open/close lever 167 rotatably supported by the first open/close lever 164 using a joint shaft 166. The vibration stopper 160 further includes upper and lower roller holders 168 and 169 as roller members mounted to the second open/close lever 167 to be relatively rotatable around the guide bar 152. The vibration stopper 160 includes upper and lower roller groups 172 and 173 as roller members supported to be rotatable to the upper and lower roller holders 168 and 169 using the roller shaft 171. The vibration stopper 160 further includes a stopper pin 174 penetrating the upper roller holder 168 and abutting against the lower roller holder 169. The vibration stopper 160 includes an adjusting handle 175 as an adjusting mechanism or a positioning member abutting against the stopper pin 174.

The open/close cylinder 162 is rotatably supported by the cylinder mount plate 161 by means of the cylinder fulcrum shaft 162a. The open/close cylinder 162 includes a cylinder rod 162a slidably inserted therein. The cylinder rod 162b has a front end connected to one end of the first open/close lever 164. The cylinder rod 162b is movable forward and rearward with respect to the open/close cylinder 162. The cylinder rod 162b moving forward and rearward serves to open or close the vibration stopper 160.

The second open/close lever 167 is connected to the first open/close lever 163 using the joint shaft 166, including upper and lower arms 167A and 167B opened at a predetermined angle. The upper and lower arms 167A and 167B are connected to the upper and lower roller holders 168 and 169, respectively, to be rotatable about the joint shaft 166 in directions reverse to each other.

The upper roller group 172 includes first and second upper rollers 172A and 172B mounted to front and rear portions of the upper roller holder 168, respectively. The first upper roller 172A is positioned on the inner side in the radial direction. The second upper roller 172B is positioned on the outer side in the radial direction. The first and second upper rollers 172A and 172B are partially overlapped with each other in the radial direction. Further, the first and second upper rollers 172A and 172B press the bar materials B1 in the recess formed therebetween.

Figure 13B:
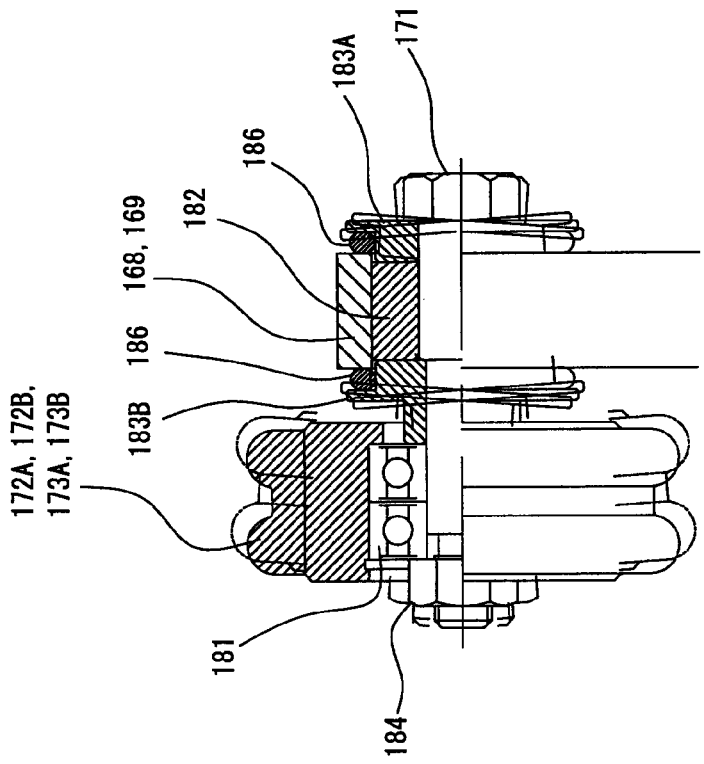
FIG. 13B is an enlarged view illustrating a roller and a roller shaft.
Figure 13A:
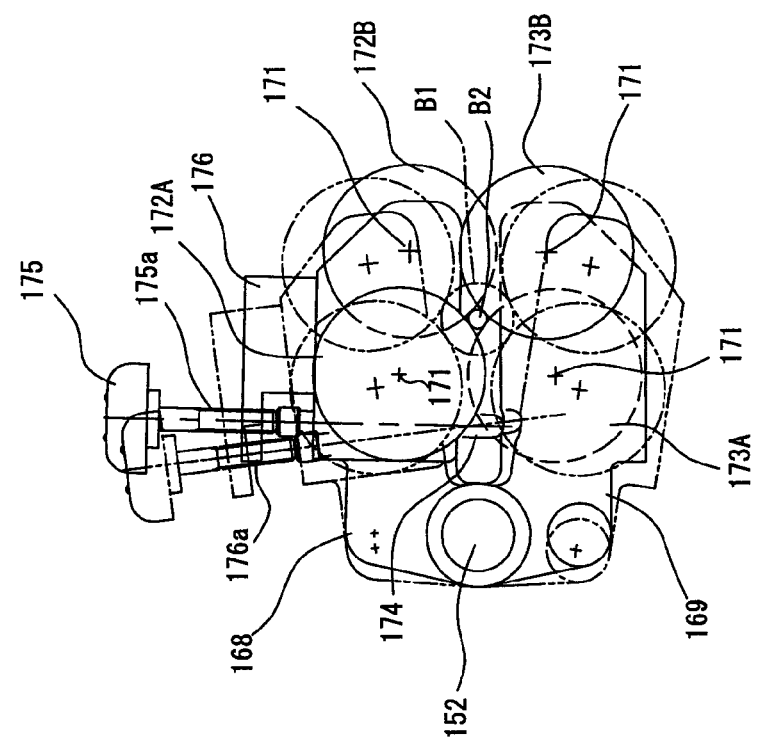
FIG. 13A is a front view, in an enlarged scale, of the vibration stopper.

The lower roller group 173 includes first and second lower rollers 173A and 173B mounted to front and rear portions of the lower roller holder 169, respectively. The first lower roller 173A is positioned on the inner side in the radial direction on the same side of the first upper roller 172A. The second lower roller 173B is positioned on the outer side in the radial direction on the same side of the second upper roller 172B. The first and second lower rollers 173A and 173B are partially overlapped with each other in the radial direction. Further, the first and second lower rollers 173A and 173B support the bar materials in the recess formed therebetween as illustrated in FIGS. 13A and 13B.

A block 176 as adjusting mechanism is fixed to the upper surface of the upper roller holder 168. The block 176 has a flanged portion 176a formed with a through hole having an inner peripheral wall having spiral thread formed thereto.

The stopper pin 174 extends through the upper roller holder 168, contacting, at its front end, the upper surface of the lower roller holder 169. When the upper roller holder 168 is closed, the stopper pin 174 abuts against the lower roller holder 169 so as to set an opening angle between the upper and lower roller holders 168 and 169.

The adjusting angle 175 includes a rod 175a inserted in the through hole of the flanged portion 176a of the block 176. A screw thread to be meshed with the spiral screw thread of the flanged portion 176a is formed to the outer peripheral wall section of the rod 175a. That is, when the adjusting handle 175 is rotated, the rod 175a is moved forward or backward due to the engagement of the screw threads. When the rod 175a is moved forward, the rod 175a pushes the stopper pin 174 to be displaced, opening the upper and lower roller holders 168 and 169 to increase the angle constituted between the holders 168 and 169. On the other hand, when the rod 175a is moved backward, the stopper pin 174 is displaced toward the rod 175a, closing the upper and lower roller holders 168 and 169 are opened so as to decrease the angle constituted between the holders 168 and 169. These operations adjust the opening angle between the upper and lower roller holders 168 and 169. The upper and lower roller holders 168 and 169 are opened in conformity with the diameter of the bar material B1. The bar material B1 is suitably held between the upper and lower roller groups 172 and 173 as illustrated in FIG. 7A. The adjusting handle 175 may be formed integrally with the stopper pin 174, and the upper roller holder 168 and the stopper pin 174 may be both formed with screw threads which are meshed with each other. The adjusting handle 175 and the block 176 constitute a linear motion mechanism of a spiral member. The stopper pin 174 may be linearly moved by using a slider/crank mechanism, a rack/pinion mechanism, a cam mechanism or like as another linear motion mechanism.

As illustrated in FIG. 13B, the first and second upper rollers 172A and 172B and the first and second lower rollers 173A and 173B are supported to the upper and lower roller holders 168 and 169, respectively, by the roller shafts 171 with the bearings 182 being interposed therebetween. The roller shafts 171 pass through holes formed to the roller holders 168 and 169 with gaps and pass through the rollers 172A, 172B, 173A and 173B. The front end of the roller shafts 171 are fixed by means of nuts on the outsides of the rollers 172A, 172B, 173A and 173B. Cushioning rubbers 182 fill between the respective roller shafts 171 and the peripheral walls of the holes of the roller holders 168 and 169. The cushioning rubber 182 is sandwiched from the front and rear sides by the first and second flanged portions 183A and 183B. The first and second flanged portions 183A and 183B are fitted into the holes of the roller holders 168 and 169. The first and second flanged portions 183A and 183B are pressed by the nuts and bearings 181 of the roller shafts 171. O-rings 186 are arranged around the first and second flanged portions 183A and 183B. According to such structure, the roller shafts 171 are movable in the radial direction, and in addition, displace the rollers 172A, 172B, 173A and 173B in the radial direction in accordance with the diameters of the bar materials B1 and B2. Thus, the bar materials B1 and B2 are centered to the first and second roller groups 172 and 173 in accordance with the lengths of the diameters thereof.

The bar feeder 101 operates as follows.

With reference to FIG. 9, the rod of the cylinder 154 is moved backward and the open/close lever 155 is rotated about the guide bar 152 in the counter-clockwise direction. The upper support holder 153 is rotated in the counter-clockwise direction with respect to the lower support holder 151, separating the upper lid 158 from the support case 156. Thus, the upper portion of the support 157 is opened.

With reference to FIG. 10, the open/close cylinder 162 is operated so as to move the cylinder rod 162 backward, and the first open/close lever 164 is rotated in the counter-clockwise direction. The first open/close lever 164 rotates the upper arm 167A of the second open/close lever 167 in the counter-clockwise direction, and also rotates the lower arm 167B in the clockwise direction. The upper arm 167A rotates the upper roller holder 168 in the counter-clockwise direction about the guide bar 152. The lower arm 167B rotates the lower roller holder 169 in the clockwise direction about the guide bar 152. According to the above operations, the angle between the upper and lower roller holders 168 and 169 increases, thereby separating the upper and lower roller groups 172 and 173 from each other. This operation opens the vibration stopper 160, defining a space through which the bar material to be taken out.

Next, the cylinder 114 of the material rack 110 is operated to rotate the take-out lever 112 in the clockwise direction. The front end 112a of the take-out lever lifts the leading bar material B1 and takes out it from the recess 111a. The taken-out bar material B1 descends on the inclined surface of the rack 111 and drops into the U-shaped groove of the support 157.

With reference to FIG. 9, the cylinder 154 is operated so as to move forward the rod, and the open/close lever 155 is rotated in the clockwise direction. When the upper support holder 153 is rotated in the clockwise direction with respect to the lower support holder 151 so that the upper lid 158 abuts against the support case 156.

The operation for closing the vibration stopper 160 will be described hereunder with reference to FIG. 10. When the open/close cylinder 162 is operated, the cylinder rod 162b is forward moved to rotate the first open/close lever 164 in the clockwise direction. The first open/close lever 164 rotates the upper arm 167A of the second open/close lever 167 in the clockwise direction, and on the other hand, rotates the lower arm 167B in the counter-clockwise direction. Then, the upper arm 167A rotates the upper roller holder 168 in the clockwise direction about the guide bar 152, and the lower arm 167B rotates the lower roller holder 169 in the counter-clockwise direction about the guide bar 152. According to the above operation, the angle between these upper and lower roller holders 168 and 169 decreases, and the upper and lower roller groups 172 and 173 approach each other. The stopper pin 174 abuts against the lower roller holder 169 and the upper and lower roller holders 168 and 169 stop their relative rotations to thereby set a predetermined angle. The upper and lower roller groups 172 and 173 grasp the bar material B1 and hold it therebetween.

With reference to FIG. 8, the feed motor 136 is driven to move the slider 131 toward the lathe 102 along the slider guide 132. According to this operation, the feed rod 121 is moved toward the lathe 102 along the axis A1. With reference to FIG. 10, the feed rod 121 is stopped temporarily in front of the bar material B1, and the finger chuck grasps the rear end of the bar material B1. Then, the feed rod 121 is again moved toward the lathe 102 together with the bar material B1 on the axis A1 and put into the spindle 107 of the lathe 102. The bar material B1 passes through the spindle 107 of the lathe 102 and is fixed to the chuck 108. The bar material B1 is worked by a blade of the lathe 102. After the working, the remaining portion of the bar material B1 is moved backward from the lathe 102 to the bar feeder 101 in accordance with the backward movement of the feed rod 121.

Figure 12:
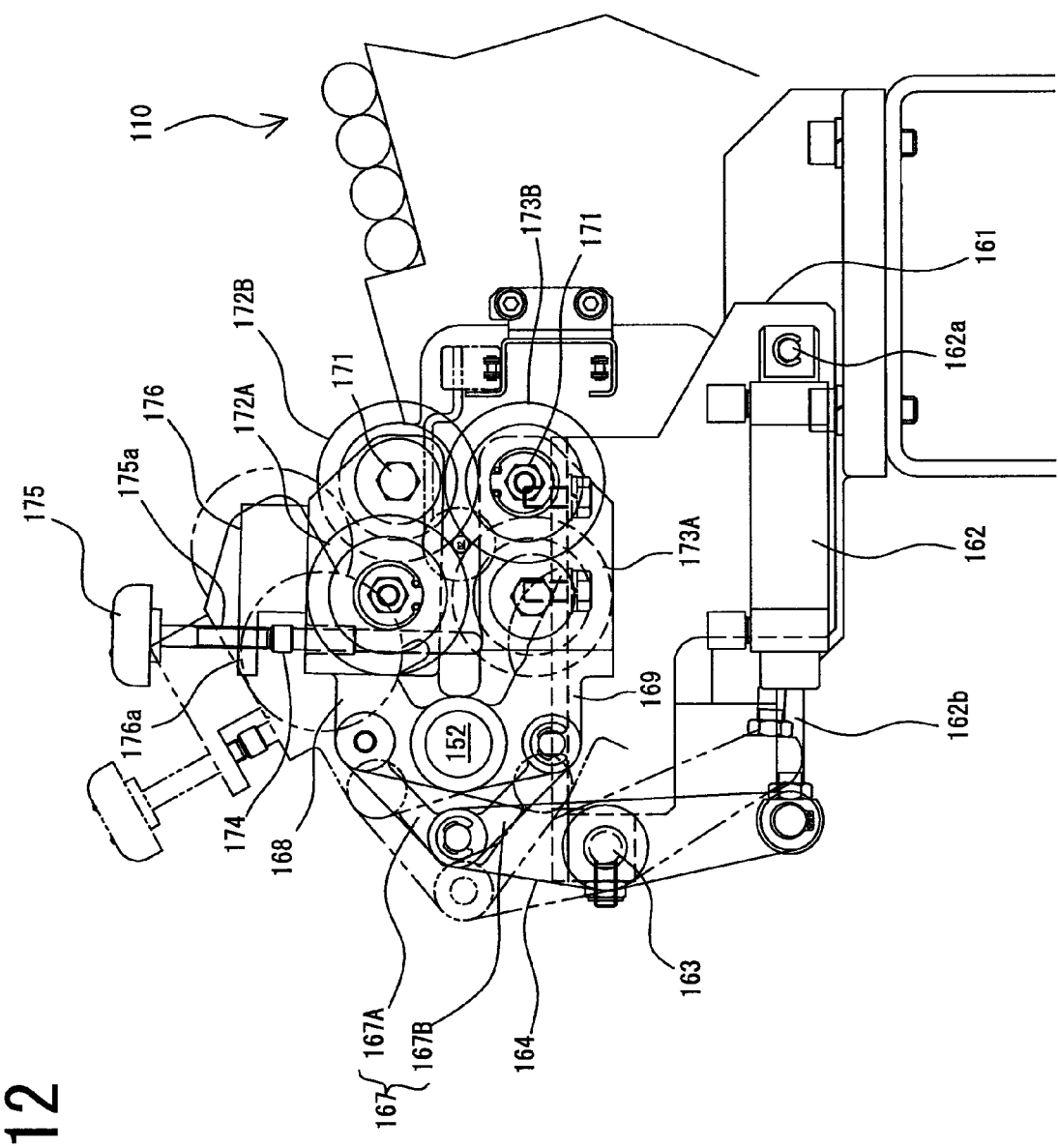
FIG. 12 is a front view of an essential structure of the bar feeder.

Next, with reference to FIGS. 12 and 13A, an adjusting method in a case of using a bar material B2 having a diameter smaller than that of the bar material B1 will be described.

First, an adjusting handle 175 is rotated to move backward a rod 175a from the stopper pin 174. The stopper pin 174 is moved backward toward the rod 175a and displaced so as to reduce the angle between the upper and lower roller holders 168 and 169. Accordingly, the upper and lower roller groups 172 and 173 suitably hold the bar material B2 therebetween.

Then, with reference to FIG. 13A, the roller shaft 171 moves in the radial direction by the bar material B1, and displaces, in the radial direction, the rollers 172A, 172B, 173A and 173B. Accordingly, the displacement of the axis of the bar material B2 is corrected and the bar material B2 is subjected to the centering operation by the upper and lower roller groups 172 and 173.

According to the bar feeder 101 of the structures mentioned above, the adjusting handle 175 adjusts the angle between the first and second roller holders 168 and 169 in accordance with the size of the material, so that the vibration prevention of the bar material is achieved in accordance with the size of the bar material to be handled.

The guide bar 152 functions as fulcrum shaft of the upper and lower roller holders 168 and 169 and as fulcrum shaft of the upper support holder 153 of the support portion 150 and the upper lid 158, so that the device is miniaturized and manufacturing cost is decreased.

The rollers 172A, 172B, 173A and 173B are displaceable in the radial direction, and accordingly, in conformity with the diameter thereof, the bar material B1 is subjected to the centering operation in conformity with the diameter thereof, thereby achieving the vibration stop of the bar material.

Figure 14:
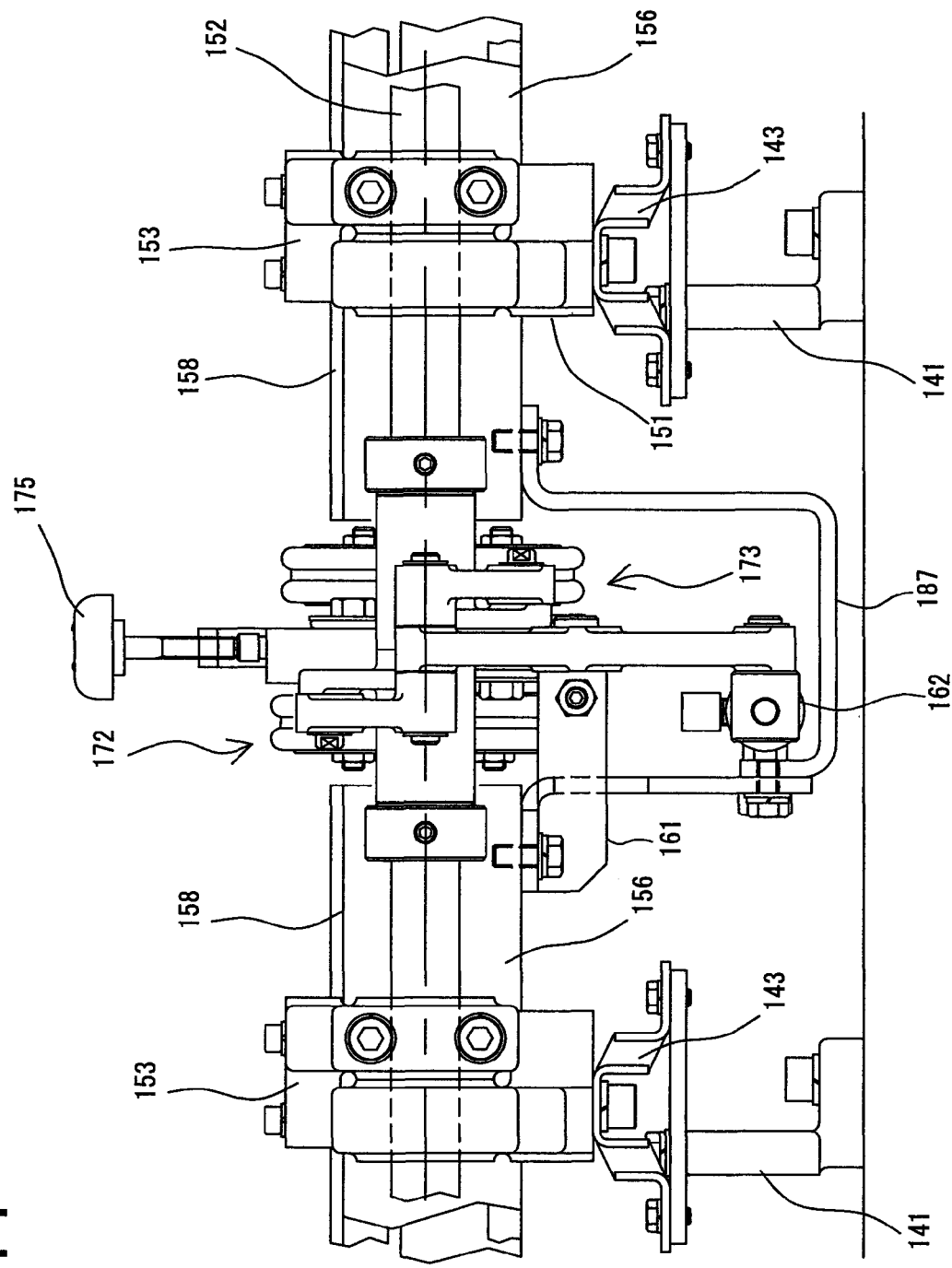
FIG. 14 is a side view illustrating the support portion and the vibration stopper according to a modified embodiment of the invention.

As illustrated in FIG. 14, the cylinder mount plate 161 and the support case 156 may be coupled by a coupling plate 187. This coupling plate 187 integrates the support portion 150 with the vibration stopper 160. The support portion 150 may be constituted as an oil feeder for feeding oil, and the vibration stopper 160 may be arranged to the support portion 150 as this oil feeder.

According to this structure, the vibration stopper 160 is mounted to the long scaled support portion 150, and therefore, the vibration stopper 160 itself is prevented from being vibrated by the vibration-proof rubber 143. Thus, the vibration of the bar material B1 at the rotating time is effectively prevented.

Fourth Embodiment

Figure 15A:
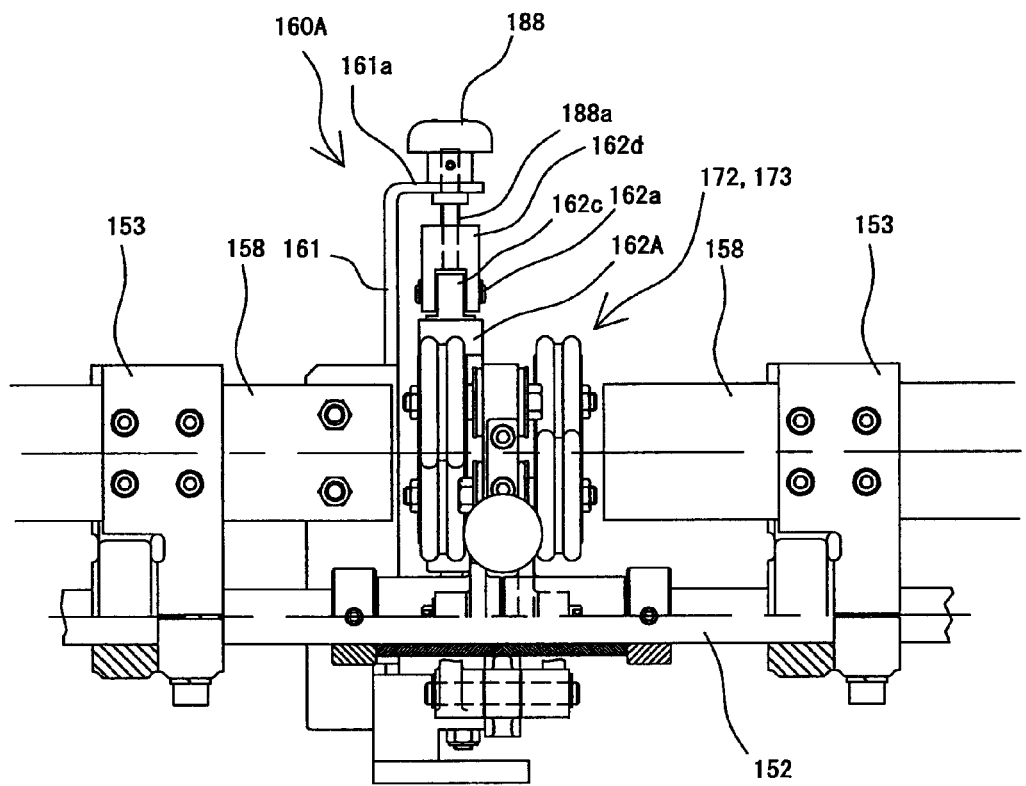
FIG. 15A is an enlarged top plan view of the support portion and the vibration stopper of the bar feeder according to a fourth embodiment of the invention.
Figure 15B:
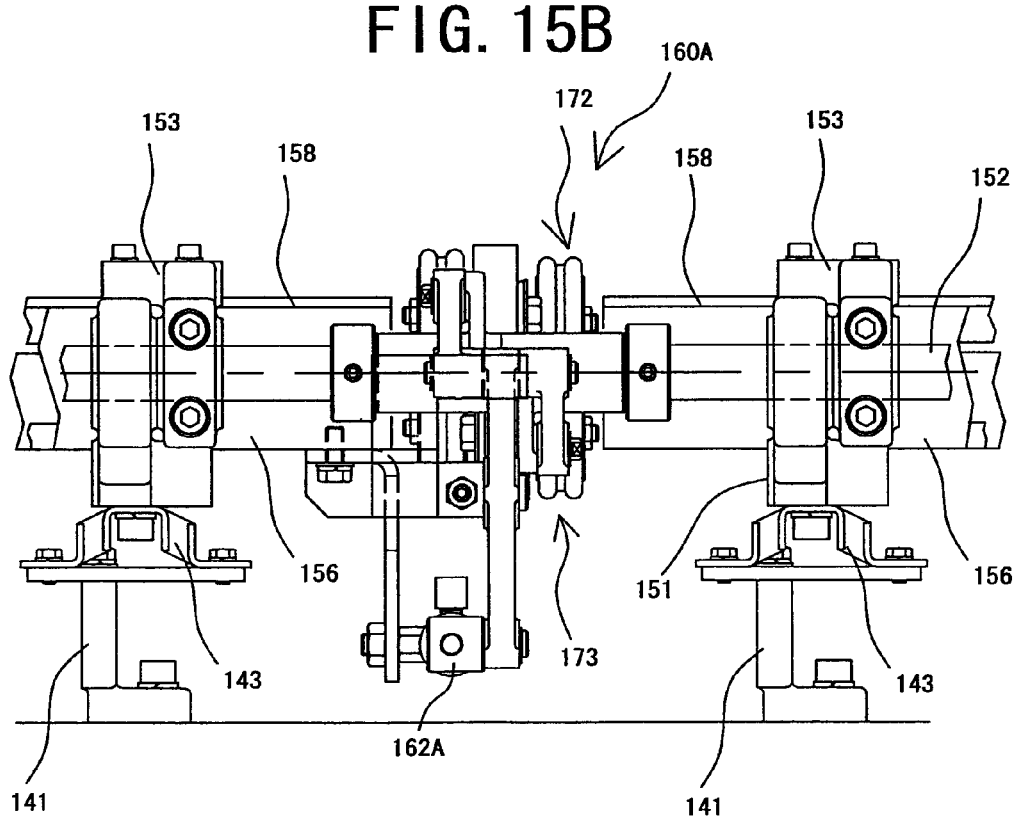
FIG. 15B is an enlarged side view thereof.

The bar feeder 101 according to the fourth embodiment of the invention will be described hereunder with reference to FIGS. 15A, 15B and 16.

An open/close cylinder 162A of a vibration stopper 160A is characterized by being provided with an adjusting handle 188 as an adjusting mechanism, a liner motion mechanism or a positioner for adjusting the opened angle formed by the upper and lower roller holders 168 and 169. The adjusting handle 188 is fixed to the cylinder mount plate 161 by sandwiching the flanged portion 161a from the front and rear direction. Further, the adjusting handle 188 is provided with a rod 188a having an outer peripheral wall having a thread formed thereto. The open/close cylinder 162A includes a bracket 162d as an adjusting mechanism coupled with a fulcrum shaft 162a and a joint member 162c. The bracket 162d has a hole at its end surface, and the hole is threaded in the inner peripheral wall thereof, the thread being engaged with the thread formed to the rod 188a. Accordingly, the adjusting handle 188 moves and displaces the open/close cylinder 162A by an amount corresponding to a distance L2. The vibration stopper 160A includes a stopper wall 189 for stopping the rotation in the counter-clockwise direction of the first open/close lever 164 to set constant the opening angle for receiving the bar material during opening of the vibration stopper 160A. Another stopper for stopping the backward movement of the cylinder rod at a predetermined position may be placed in place of the stopper wall 189.

Figure 16:
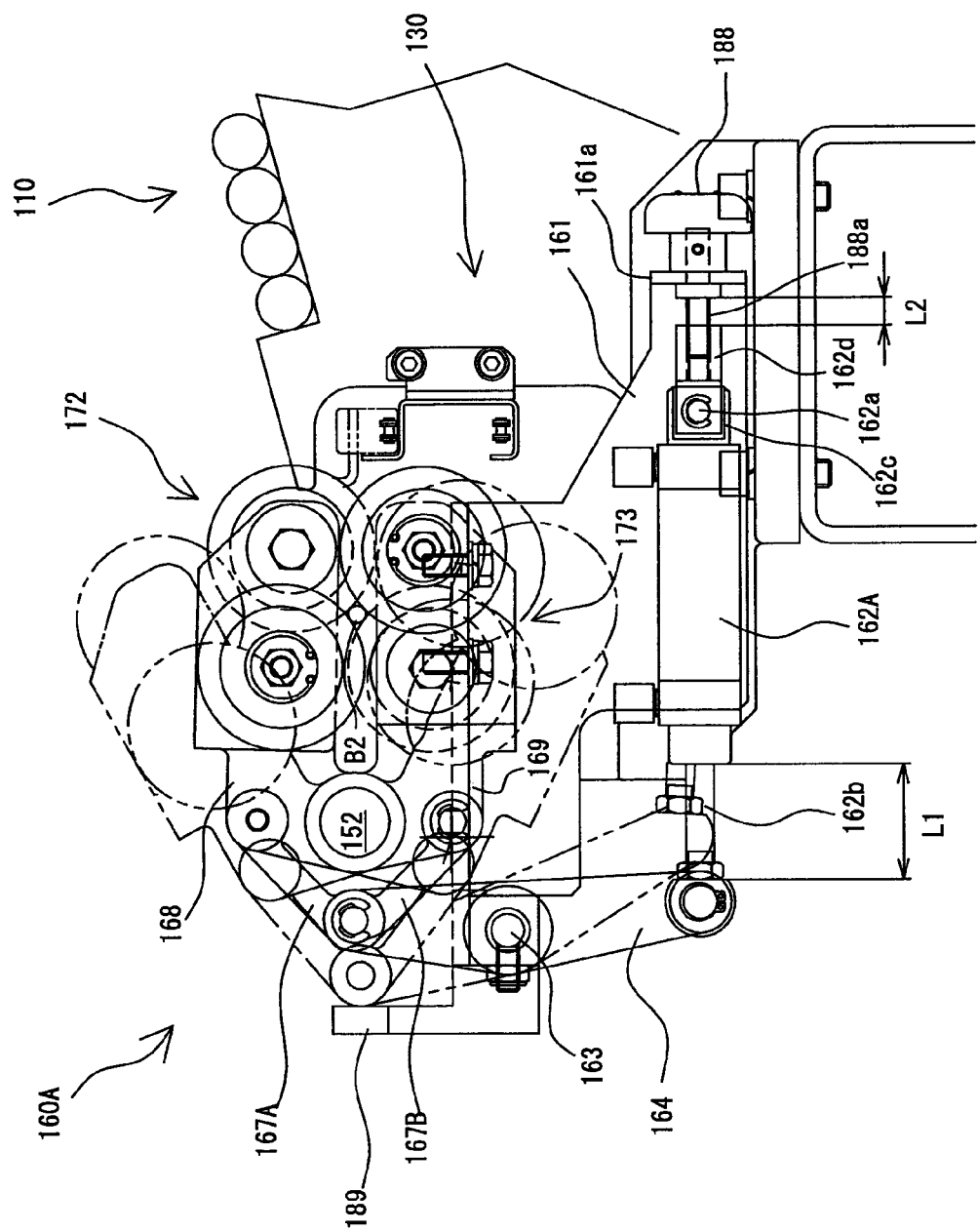
FIG. 16 is a front view of an essential portion of the bar feeder illustrated in FIG. 15A.

With reference to FIG. 16, when the cylinder rod 162b is moved forward by the maximum distance, the rod has a length L1. At this time, the vibration stopper 160A has a closed state. With the vibration stopper 160A closed, the upper and lower roller holders 168 and 169 are closed to the predetermined angle, and the bar material B2 having a small diameter is held between the upper and lower roller groups 172 and 173.

Figure 17:
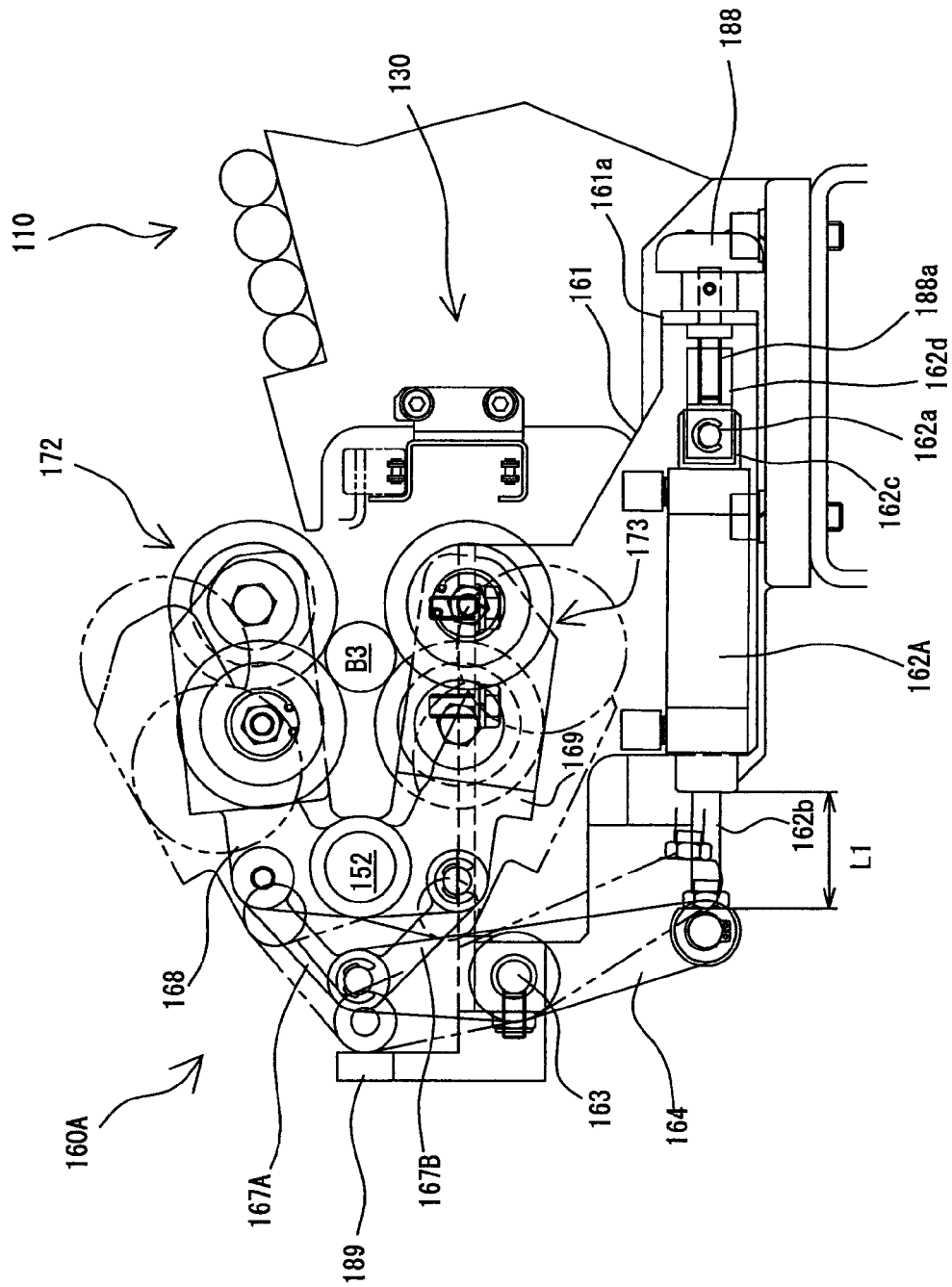
FIG. 17 is a front view of an essential portion of the bar feeder illustrated in FIG. 15A, in which a bar material having a large diameter is disposed.

With reference to FIG. 17, with the vibration stopper 160A closed, the adjusting method in conformity with the diameter of the bar material will be described hereunder. In the case when the vibration stopper 160A serves to stop the vibration of a bar material B3 having a diameter larger than that of the bar material B2, the open/close cylinder 162A is not operated and the cylinder rod 162b maintains the rod length L1. Then, when the adjusting handle 188 is rotated, the rod 188a is moved into the bracket 162d due to the engagement of the threads thereof, and the open/close cylinder 162A is moved backward toward the adjusting handle 188. According to such operations, the upper and lower roller holders 168 and 169 are relatively rotated so as to increase the opening angle so as to be conformed with the diameter of the bar material B3. Thus, the bar material B3 is appropriately held between the upper and lower roller groups 172 and 173.

According to the vibration stopper 160A, the adjusting handle 188 moves the open/close cylinder 162A to adjust the opening angle between the upper and lower roller holders 168 and 169 in accordance with the diameter of the bar material, thus appropriately holding the bar material between the upper and lower roller groups 172 and 173.

Fifth Embodiment

Figure 18:
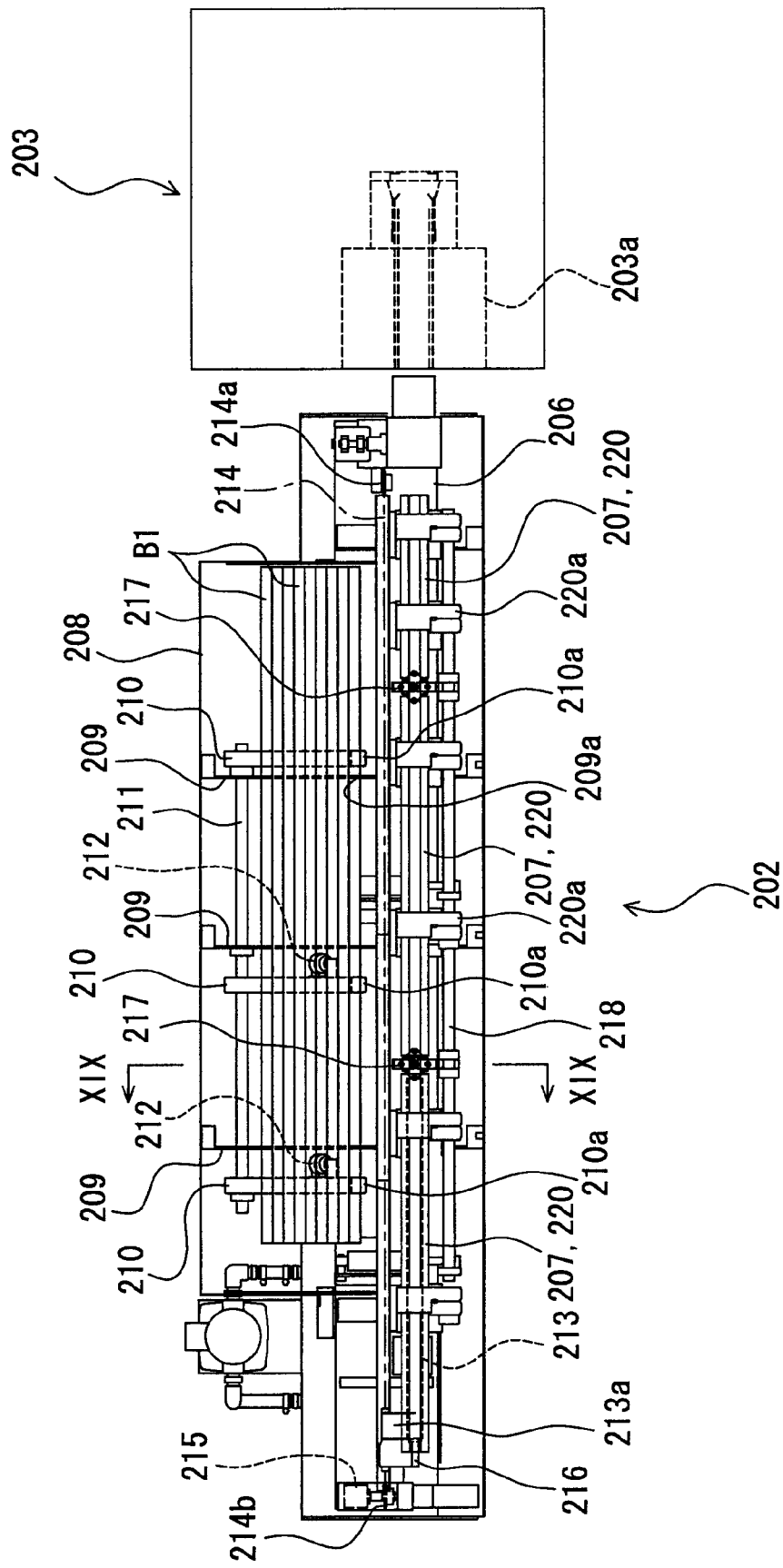
FIG. 18 is a plan view illustrating a bar feeder according to a fifth embodiment of the invention, in which a cover is removed.
Figure 19:
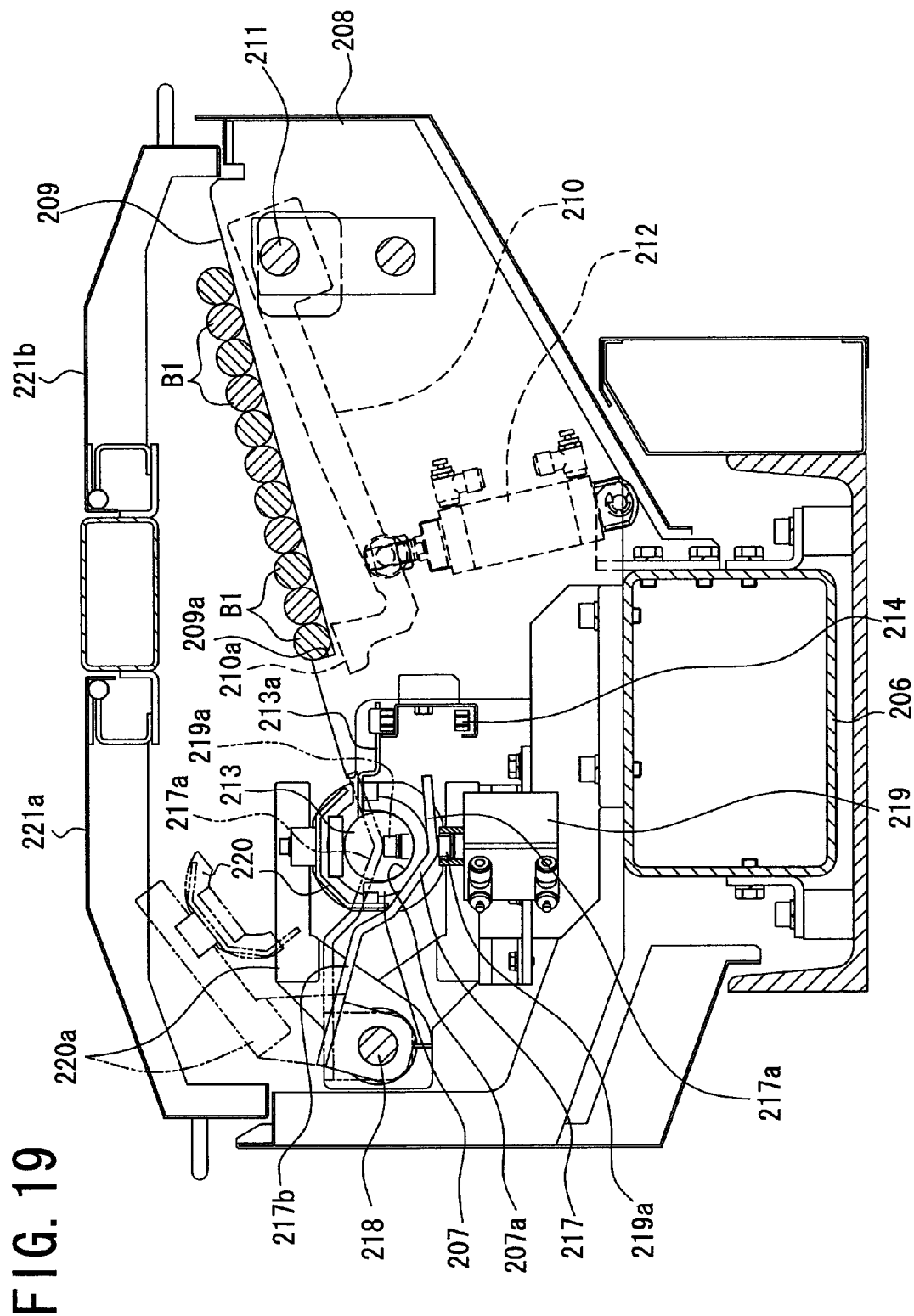
FIG. 19 is a sectional view taken along the line XIX-XIX in FIG. 18.

With reference to FIGS. 18 and 19, the fifth embodiment of the invention will be described. As illustrated, a bar feeder 202 is located near a lathe 203 as a working machine. On the side surface of the bar feeder 202, there is mounted an operation board 204 provided with a switch performing ON/OFF operation to the bar feeder 202. A control box 205, in which a control unit for automatically controlling the bar feeder 202 is accommodated, is also located to the lower portion of the bar feeder 202.

As illustrated in FIGS. 18 and 19, the bar feeder 202 includes a main frame 206 extending in parallel with the extension of a spindle 203 of the lathe 203. The bar feeder 202 is held by the main frame 206 so that the support portion 207 having a U-shaped groove 207a is positioned on the extension of the spindle 203a of the lathe 203.

The support portion 207 includes a material rack 208 on one side, the material rack 208 including a plurality of support members 209 having a number of bar materials B1 placed thereon. The support members 209 are fixed to the main frame 206, with the upper surface of the support member 209 inclined downward toward the U-shaped groove 207a of the support portion 207. The upper surface of the support member 209 has thereon a number of bar materials B1 arranged in the U-shaped groove 207a in a row in parallel therewith. The support member 209 has a stopper 209a located on the side of the support portion 207. The stopper 209a serves to receive the leading bar material B1, stopping the row of the bar materials B1.

A push-up member 210 is located between the support members 209, 209 at a position lower than the upper surface of the support members 209. The push-up member 210 is coupled with a horizontal shaft 211 supported in parallel with the support portion 207 on a side opposite to the stopper 209a of the support member 209. The front end of the push-up member 210 has a projection 210a directly opposing to the leading bar material B1, from the lower side thereof, stopped by the stopper 209a. The push-up member 210 is coupled with the main frame 206 using a piston-cylinder assembly 212. When the piston-cylinder assembly 212 is contracted, the push-up member 210 is moved to a waiting position indicated with broken line in FIG. 19. When the piston-cylinder assembly 212 is expanded, the push-up member 210 is vertically rotated with the horizontal shaft 211 being fulcrum, and pushed up the leading bar material B1 by the projection 210a thereof. The pushed-up bar material B1 rides over the stopper 209a and rolls down toward the U-shaped groove 207a of the support portion 207. The piston-cylinder assembly 212 is controlled by a control unit, not illustrated, located in the control box 205. As illustrated in FIG. 18, the support portion 207 is provided with a feed pipe 213 on the side reverse to the lathe (203) side in the U-shaped groove 207a. The feed pipe 213 is reciprocally movable between the waiting position indicated with the broken line in FIG. 18 and the spindle (203a) side of the lathe 203. As a moving member of the feed pipe 213, an endless chain 214 is arranged as illustrated in FIGS. 18 and 19. The endless chain 214 is stretched over sprockets wheels 214a and 214b arranged on the lathe side and the opposite side of the main frame 206. Further, in FIG. 18, reference numeral 215 denotes a motor for driving the endless chain 214. The motor 215 is controlled by the control unit located in the control box 205.

The feed pipe 213 includes a primary feed member 216 for moving forward a newly fed bar material B1 when it is newly fed into the U-shaped groove 207a. This primary feed member 216 is coupled with the endless chain 214.

The feed pipe 213 also includes a coupling arm 213a extending from the feed pipe 213 to the primary feed member (216) side and the endless chain (214) side. This coupling arm 213a is detachable with respect to the primary feed member 216 and the endless chain 214. Furthermore, the feed pipe 213 is movable upward by an elevating mechanism, not illustrated, in the waiting position indicated with a solid line in FIG. 18. When the feed pipe 213 is moved upward, the coupling arm 213a is disengaged from the primary feed member 216 and the endless chain 214. On the contrary, when the feed pipe 213 is lowered, the coupling arm 213a is engaged with the primary feed member 216 and the endless chain 214. A piston-cylinder assembly may be adopted as such elevating mechanism.

When the new bar material B1 is fed into the U-shaped groove 207a from the material rack 208, the elevating mechanism, not illustrated, moves the feed pipe 213 to the elevated position. When the bar material B1 is put inside the U-shaped groove 207a, the motor 215 is positively driven to travel the endless chain in one direction. Then, the primary feed member 216 pushes forward the bar material B1 over the front end of the feed pipe 213. When the motor 215 is reversely driven, the endless chain 214 travels in the reverse direction. The primary feed member 216 returns backward from the feed pipe 213. The feed pipe 213 is then lowered and connected to the primary feed member 216 and the endless chain 214. Thereafter, the motor 215 is again positively rotated to travel the endless chain 214 in the one direction. The feed pipe 213 moves forward in the U-shaped groove 207a toward the lathe (203) side, pushing the front end of the bar material B1 toward the spindle (203a) side of the lathe 203. The spindle 203a cuts out a product from the front end of the bar material B1 while grasping and rotating the front end of the bar material B1, and during this operation, the feed pipe 213 supports the rear end of the bar material B1. After the cutting operation of the products are repeated and the bar material B1 is consumed, the motor 215 is driven reversely to thereby travel the endless chain 214 in the reverse direction. The feed pipe 213 is moved backward in the U-shaped groove 207a and releases a remaining portion of the bar material B1, and thereafter, returns to the original position. Such operations are repeated thereafter so as to feed the new bar material B1 into the U-shaped groove 207a.

As illustrated in FIG. 18, the support portion 207 is separated into three sections in the longitudinal direction thereof. It is of course possible to be divided into sections in more or less numbers. As illustrated in FIGS. 18 and 19, the support portion 207 is provided with a guide lever 217, which is reciprocally movable in a direction crossing the opening side and the bottom side of the U-shaped groove 207a at each separated position thereof.

Each of the guide lever 217 includes a bent portion 217a for receiving the bar material B1 and an arm 217b for holding the bent portion 217a.

The bent portion 217a has a bent angle such that rapid dropping of the bar material B1 into the U-shaped groove 207a, when the bar material B1 stops at the groove opening side of the U-shaped groove 207a, is prevented, and the rolling of the bar material B1 on the U-shaped groove 207a on the side reverse to the material rack 208 is also prevented. In an actual structure, the bent portion 217a has a dull angle. The bent portion 217a may have a curved structure.

The base end of each arm 217b is supported to be rotatable by the support shaft 218 located above the main frame 206 on the side opposite to the material rack 208 in the support portion 207. Accordingly, each guide lever 217 is rotatable in the vertical direction with the support shaft 218 being the fulcrum. The bent portion 217a is movable so as to cross the U-shaped groove 207a between its opening and bottom sides.

As illustrated in FIG. 19, the piston-cylinder assembly 219 as an actuator is located below each guide lever 217 so as to be directed upward and fixed to the main frame 206. The front end of the rod 219a of the piston-cylinder assembly 219 is directed toward the lower surface of the bent portion 217a. The piston-cylinder assembly 219 is controlled by the control unit in the control box 205. When the piston-cylinder assembly 219 is contracted, the rod 219a thereof is lowered as indicated with the solid line in FIG. 19, and the guide lever 217 is rotated toward the groove bottom side by the self-gravity thereof. On the contrary, when the piston-cylinder assembly 219 is expanded, the rod 219a thereof is moved upward as indicated with two-dot-chain line in FIG. 19. The guide lever 217 is pushed upward by the rod 219a on the groove opening side of the U-shaped groove 207a.

When the bar material B1 is fed from the material rack 208 to the inside of the U-shaped groove 207a, the guide lever 217 is positioned on the groove opening side of the U-shaped groove 207a to receive the bar material B1 by the bent portion 217a by the expanding operation of the rod 219a of the piston-cylinder assembly 219. When the bar material B1 is rested on the bent portion 217a, the rod 219a is lowered by the contraction of the piston-cylinder assembly 219. The guide lever 217 is turned on the groove bottom side of the U-shaped groove 207a by the self-gravity thereof, and the bar material B1 is transferred quietly on the groove bottom portion. This operation buffers impact or noise which may be caused at a time when the bar materials B1 are fed into the U-shaped groove 207a. In a case when the bar material B1 is erroneously fed into the U-shaped groove 207a, the piston-cylinder assembly 219 is expanded by operating a predetermined button on the operation board 204a, and the bar material B1 is then easily taken out of the U-shaped groove 207a. That is, when the piston-cylinder assembly 219 is expanded, the rod 219a thereof is moved upward and the bar material B1 is pushed upward to the groove opening portion of the U-shaped groove 207a by the operation of the guide lever 217a. According to such operation, an operator easily returns the bar material B1 on the material rack 208.

As illustrated in FIG. 19, the support portion 207 includes an upper support section 220, on its upper side, for opening or closing the U-shaped groove 207a from the groove opening side thereof. The upper support section 220 is actually a lid member having substantially a U-shaped groove symmetric with the support portion 207. This upper support section 220 is supported to be rotatably to the support shaft 218 supporting the guide lever 217 by using a support arm 220a. In this embodiment, the groove opening of the U-shaped groove 207a is opened or closed in association with the vertical movement of the feed pipe 213 by means of piston-cylinder assembly, not illustrated, for elevating the feed pipe 213.

Furthermore, as illustrated in FIG. 19, the upper portion of the bar feeder 208 is covered by open/close lids 221a and 221b. When the bar material B1 pushed upward on the U-shaped groove 207a by the guide lever 217 is returned on the material rack 208, the open/close lids 221a and 221b are opened.

Next, the operation of the bar feeder of the structure mentioned above will be described hereunder.

Figure 20A:
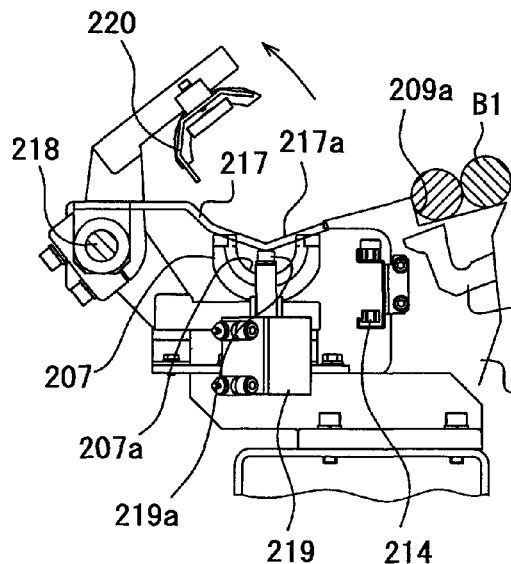
FIGS. 20A to 20D are sectional views similar to FIG. 19 and illustrate bar material feeding processes.

(1) At the time when the bar material B1 is fed in the U-shaped groove 207a of the support portion 207, the piston-cylinder assembly, not illustrated, is driven so as to move upward the upper support section 220 as illustrated in FIG. 20A and then to open the groove opening of the U-shaped groove. At the same time, the feed pipe 213 illustrated in FIG. 19 is moved upward above the U-shaped groove 207a.

Figure 20B:
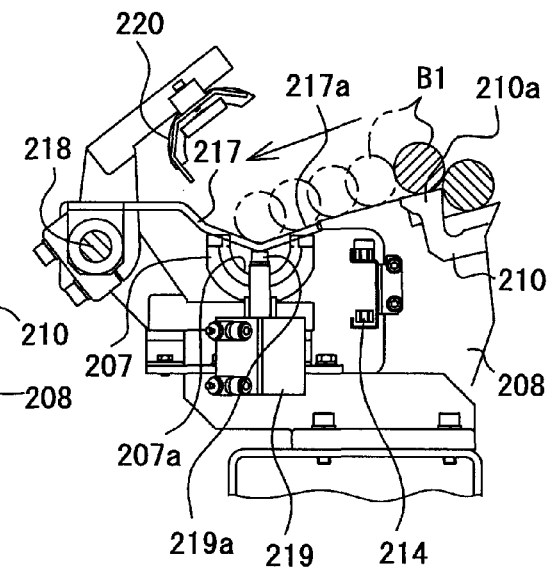

(2) Next, as illustrated in FIG. 20B, the piston-cylinder assembly 212 of the material rack 208 is operated to raise the push-up member 210 so as to push up the leading bar material B1 by the projection 210a formed to the front end thereof. The pushed-up bar material B1 rides over the stopper 209a as indicated with the two-dot-chain line and rolls toward the stopper 209a on the material rack 208 and then stops there.

On the groove opening side of the U-shaped groove 207a, the guide lever 217 pushed-up by the rod 219a of the piston-cylinder assembly 219 waits. The rolling bar material B1 is received by the bent portion 217a of the guide lever 217.

Figure 20C:
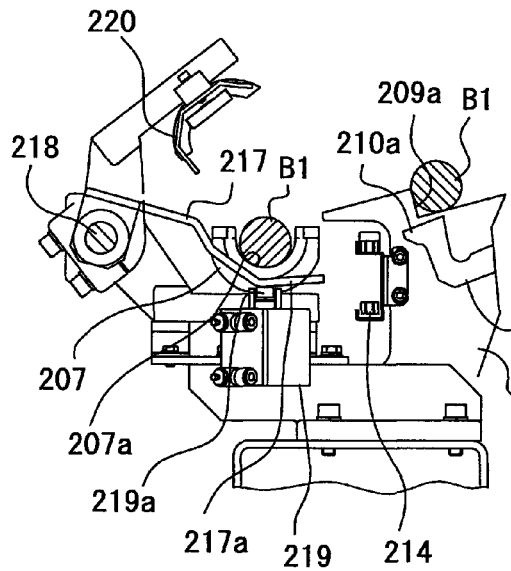

(3) Then, as illustrated in FIG. 20C, the rod 219a of the piston-cylinder assembly 219 is lowered. The guide lever 217 receiving the bar material B1 moves from the groove opening portion toward the groove bottom side, and gently transfers the bar material B1 inside the U-shaped groove 207a. Accordingly, the feeding of the bar material B1 inside the U-shaped groove 207a is safely performed.

Subsequently, the motor 215 is driven positively, and the primary feed member 216 is moved forward by the travelling of the endless chain 214. The primary feed member 216 pushes forward the bar material B1 over the front end of the feed pipe 213. Thereafter, the endless chain 215 is driven so as to move backward, and the primary feed member 216 is returned to the original position and stopped there.

Figure 20D:
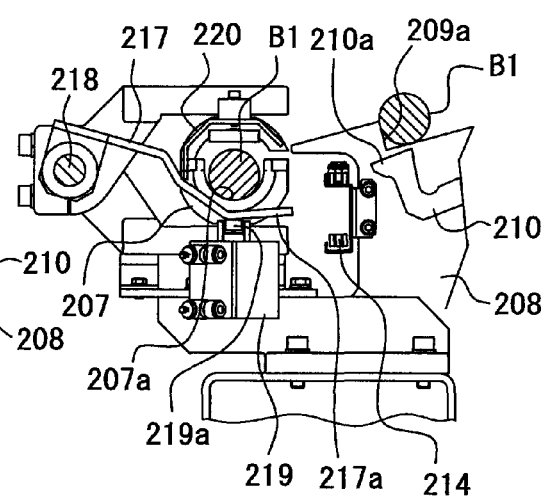

(4) According to the operation of the piston-cylinder assembly, not illustrated, the upper support section 220 is lowered as illustrated in FIG. 20D, and the groove opening of the U-shaped groove 207A of the support portion 207 is closed. At the same time, the feed pipe 213 is lowered into the U-shaped groove 207a and stopped there. The coupling arm 213a of the feed pipe 213 is connected to the primary feed member 216 and the endless chain 214.

(5) Thereafter, the motor 215 is driven positively and the endless chain 214 travels in one direction. The feed pipe 213 moves forward in the U-shaped groove 207a toward the lathe (203) side to push the front end of the bar material B1 toward the spindle (203a) side of the lathe 203.

The spindle 203a grasps the front end of the bar material B1 and cuts out products from the front end side of the bar material while being rotated. During this process, the feed pipe 213 supports the rear end of the bar material B1, preventing the vibration of the bar material B1.

When the cut-out operation to the products is repeated and the bar material B1 is consumed, the motor 215 is reversely driven and the endless chain 214 is reversely traveled. According to such operation, the feed pipe 213 moves backward in the U-shaped groove 207a, releases the remaining bar material, and returns to the original position. Thereafter, a succeeding new bar material B1 is fed from the material rack 208 by the same operations as those mentioned above, and this new bar material B1 is also cut out so as to provide products.

(6) In the above step (3), if the bar material B1 is erroneously fed into the U-shaped groove 207a, a predetermined switch of the operation board 204 is operated by an operator.

Figure 21A:
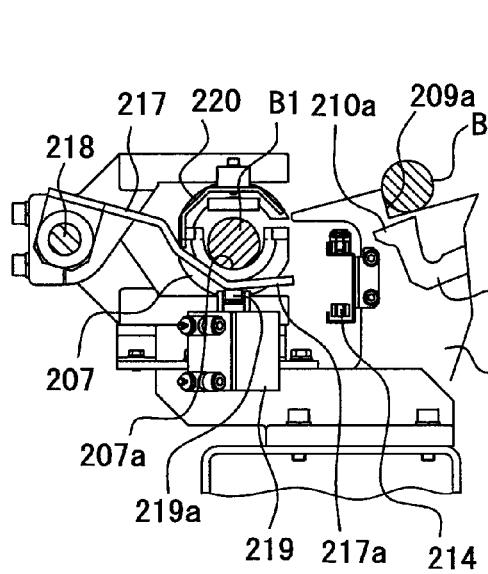
FIGS. 21A to 21D are sectional views similar to FIG. 19 and illustrate processes for taking out the bar material from the support portion.
Figure 21B:
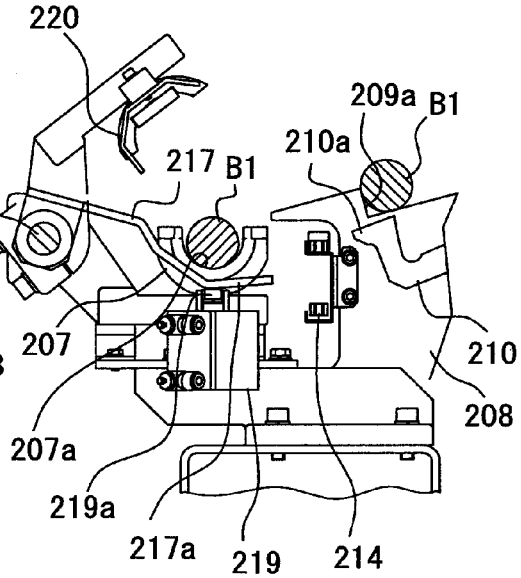

According to such switching operation, the piston-cylinder assembly, not illustrated, is operated so that, as illustrated in FIG. 21A, the upper support section 220 closing the groove opening of the U-shaped groove 207a of the support portion 207 is rotated upward as illustrated in FIG. 21B, and the groove opening of the U-shaped groove 207a is opened to expose the bar material B1. According to this operation, the feed pipe 213 is also moved upward.

Figure 21C:
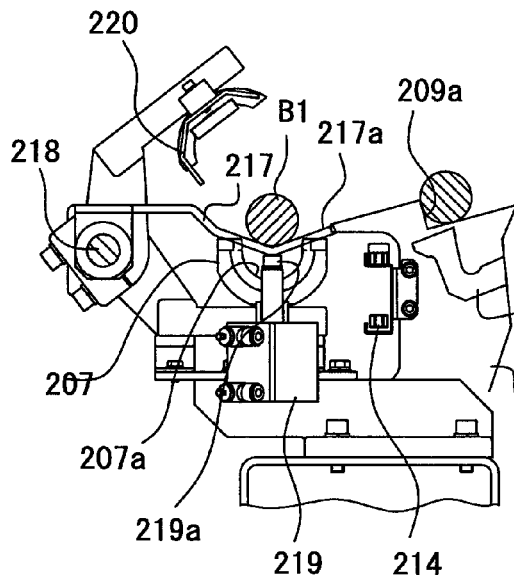

(7) Next, as illustrated in FIG. 21C, the piston-cylinder assembly 219 is operated. The rod 219a thereof is then moved upward and the guide lever 215 is rotated upward. According to this operation, the bar material B1 is pushed out of the U-shaped groove 207a.

Figure 21D:
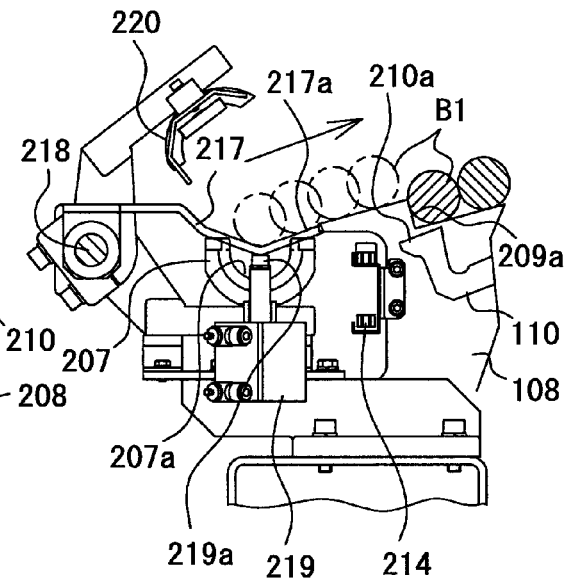

(8) As indicated with the two-dot-chain line in FIG. 21D, the bar material B1 is returned onto the material rack 208 by, for example, rolling the bar material B1 on the material rack 108 from the bent portion 217a of the guide lever 217 by the operator.

Sixth Embodiment

Figure 22A:
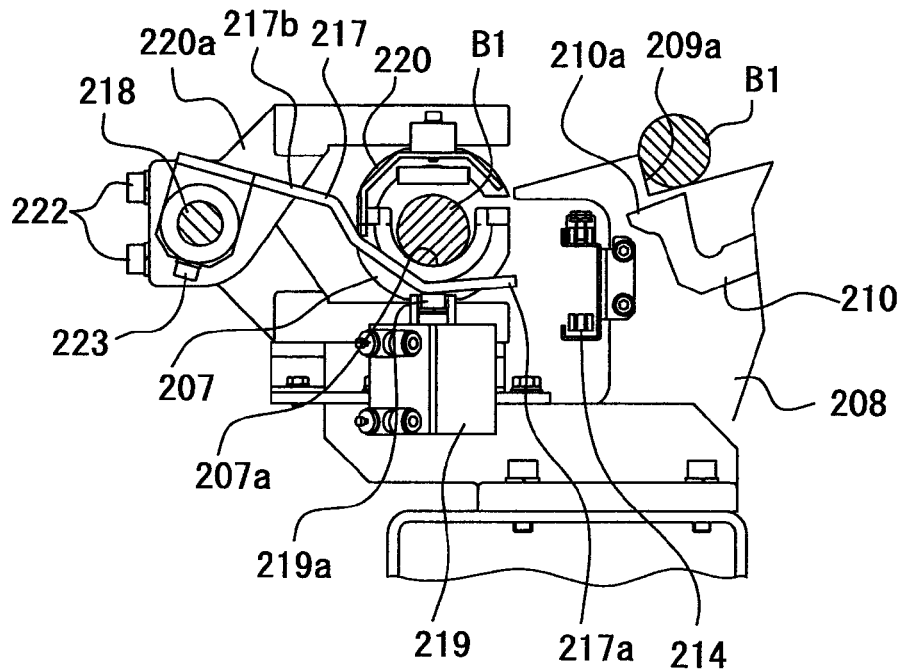
FIGS. 22A and 22B are a sectional views similar to FIG. 19 illustrating another embodiment of the invention.
Figure 22B:
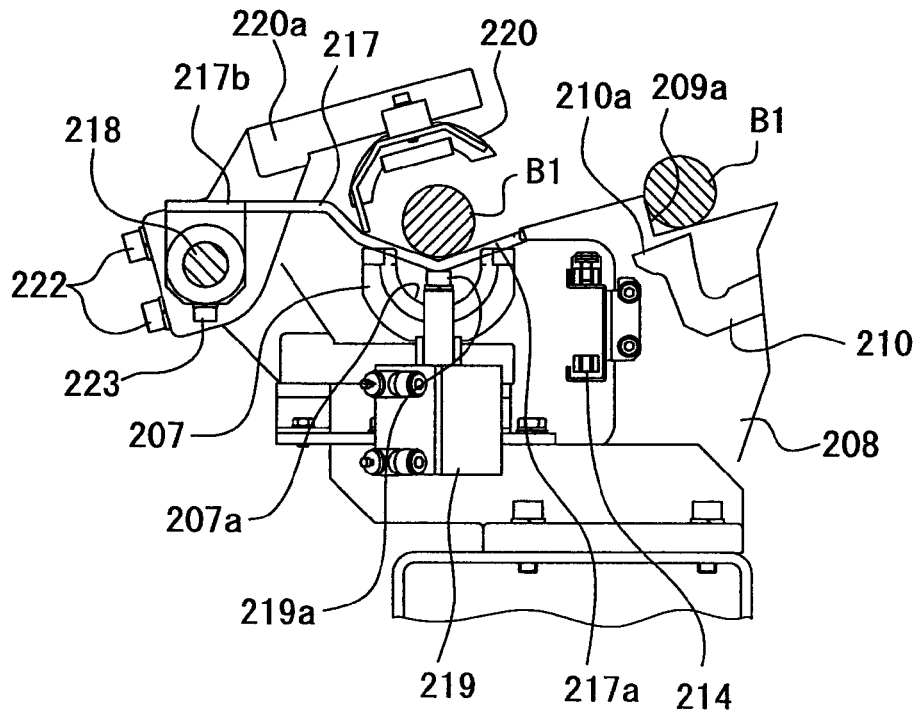

As illustrated in FIGS. 22A and 22B, in this embodiment, the arm 217b of the guide lever 217 and the support arm 220a of the upper support section 220 are fixed by means of the same support shaft 218 so as to be rotated integrally. In FIGS. 22A and 22B, reference numerals 222 and 223 denote fixing screws for fixing the arm 217b of the guide lever 217 and the support arm 220a of the upper support section 220 to the support shaft 218, respectively.

According to this structure, after receiving the bar material B1 by the guide lever 217 on the groove opening side of the U-shaped groove 207a, the piston-cylinder assembly 219 is contracted so as to be moved on the groove bottom side, and the U-shaped groove 207a is closed by the upper support section 220. On the other hand, when the piston-cylinder assembly 219 is expanded, the guide lever 217 is moved from the groove bottom side toward the groove opening side of the U-shaped groove 207a, and the groove opening of the U-shaped groove 207a is opened by the upper support section 220.

Like reference numerals are added to elements or portions corresponding to those in the fifth embodiment, and the description thereof is omitted herein.

Seventh Embodiment

In this seventh embodiment, the guide lever 217 is maintained in its lowered state as illustrated in FIGS. 20C and 20D at the time of feeding the bar material B1 illustrated in FIGS. 20A and 20B. The guide lever 217 is operated so as to be moved upward only at the time when the bar material B1 is erroneously fed into the U-shaped groove by a control miss of the operator.

That is, in the case of feeding an erroneous bar material B1, the predetermined switch of the operation board is operated by the operator.

According to such switching operation, the piston-cylinder assembly, not illustrated, is operated so that, as illustrated in FIG. 21A, the upper support section 220 closing the groove opening of the U-shaped groove 207a of the support portion 207 is rotated upward as illustrated in FIG. 21B, and the groove opening of the U-shaped groove 207a is opened to expose the bar material B1. According to this operation, the feed pipe 213 is also moved upward.

Subsequently, as illustrated in FIG. 21C, the piston-cylinder assembly 219 is operated. The rod 219a thereof is then moved upward to rotate upward the guide lever 215. According to this operation, the bar material B1 is pushed out of the U-shaped groove 207a.

As indicated with the two-dot-chain line in FIG. 21D, the bar material B1 is rolled, for example, on the material rack 108 from the bent portion 217a of the guide lever 217 by the operator. According to this operation, the bar material B1 is returned on the material rack 208.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims. For example, in the above fifth, sixth and seventh embodiments, the bar material pushed out on the U-shaped groove by the guide lever is returned on the material rack by the operator. The bar material may be, however, returned on the material rack automatically by mounting an actuator such as piston-cylinder assembly to the guide lever.

Furthermore, in the fifth embodiment, the guide lever is moved upward after opening the upper support section, but the guide lever and the upper support section may be simultaneously operated to shorten the working time.

Still furthermore, in the sixth embodiment, the piston-cylinder assembly for vertically moving the guide lever may be eliminated, and the guide lever may be hence operatively associated with the upper support section by the piston-cylinder assembly for vertically moving the upper support section.

According to the first aspect of the invention, the vibration attenuation mechanism absorbs vibrations of the feed rod, preventing the feed rod from vibrating.

In the second aspect of the invention, the flow path allows a fluid to flow between the first and second fluid reservoirs, uniformly dispersing the fluid into the first and second fluid reservoirs, thus improving vibration prevention effect of the feed rod.

In the third and fourth aspects of the invention, the adjusting mechanism displaces the stopper or cylinder to adjust an angle between the first and second roller members in accordance with the size of the material, achieving vibration stop of materials having different sizes.

The fulcrum shafts of the first and second roller members support the upper lid of the support portion to be rotatable, achieving a smaller sized and manufacturing cost reduced device.

The roller is radially displaceable, allowing materials with different sizes to be centered to the roller, thus achieving appropriate vibration stop of the materials.

In the fifth aspect of the invention, when the bar material is falsely fed in the U-shaped groove, the guide lever easily and quickly takes out the bar material from the U-shaped groove of the support portion.

In the sixth aspect of the invention, the guide lever allows the bar material to be fallen into the U-shaped groove of the support portion, thereby preventing an impact force from acting on the support portion, preventing a noise from being produced.

In the seventh aspect of the invention, the guide lever allows the bar material to be quietly fallen in the U-shaped groove, thereby preventing an impact force from acting on the support portion, preventing a noise from being produced. When the bar material is falsely fed into the U-shaped groove, the guide lever easily and quickly takes out the bar material from the U-shaped groove.

The upper support portion for opening and closing the U-shaped groove of the support portion prevents the bar material from dropping out from the U-shaped groove. The support portion is cooperated with movement of the guide lever moving, and both the driving portions are integrated, simplifying the structure of the bar feeder.

The integration of the upper support portion and the guide lever and the common actuator allow the structure of the bar feeder to be simplified.

What is claimed is:

1. A working machine having a bar feeder, the bar feeder comprising:
    a support portion provided with a U-shaped groove located on an extension of a spindle of the working machine;
    a material rack supporting a bar material in parallel with the U-shaped groove of the support portion, the bar material being to be fed to the U-shaped groove of the support portion;
    a feed pipe for pushing out the bar material toward the spindle, the bar material being fed in the U-shaped groove from the material rack; and
    a guide lever reciprocating in a direction of crossing between a groove opening side and a groove bottom side of the U-shaped groove,
    the guide lever being controlled to move from the groove bottom side to the groove opening side to push out the material toward the groove opening side upon returning of the bar material to the material rack from the U-shaped groove,
    the support portion including an upper support section for opening or closing the U-shaped groove of the support portion from the groove opening side, and
    the upper support section being controlled to cooperate with the guide lever in a manner such that when the guide lever moves from the groove bottom side toward the groove opening side, the upper support section opens the U-shaped groove,
    integrated by a common support shaft and are actuated at different times to move forward and away from each other.

2. A working machine having a bar feeder, the bar feeder comprising:
    a support portion provided with a U-shaped groove located on an extension of a spindle of the working machine;
    a material rack supporting a bar material in parallel with the U-shaped groove of the support portion, the bar material being to be fed to the U-shaped groove of the support portion;
    a feed pipe for pushing out the bar material toward the spindle, the bar material being fed in the U-shaped groove from the material rack; and
    a guide lever reciprocating in the U-shaped groove in a direction crossing between a groove opening side and a groove bottom side of the U-shaped groove,
    the guide lever being controlled to receive the bar material on the groove opening side to move toward the groove bottom side upon supplying of the bar material into the U-shaped groove from the material rack,
    the support portion including an upper support section for opening or closing the U-shaped groove of the support portion from the groove opening side, and
    the upper support section being controlled to cooperate with the guide lever in a manner such that when the guide lever receives the bar material on the groove opening side to move toward the groove bottom side, the upper support section closes the U-shaped groove,
    wherein the upper support section and the guide lever are integrated by a common support shaft and are are actuated at different times to move forward and away from each other.

3. A working machine having a bar feeder, the bar feeder comprising:
    a support portion provided with a U-shaped groove located on an extension of a spindle of the working machine;
    a material rack supporting a bar material in parallel with the U-shaped groove of the support portion, the bar material being to be fed to the U-shaped groove of the support portion;
    a feed pipe for pushing out the bar material toward the spindle, the bar material being fed in the U-shaped groove from the material rack; and
    a guide lever reciprocating in the U-shaped groove in a direction crossing between a groove opening side and a groove bottom side of the U-shaped groove,
    the guide lever being controlled to receive the bar material on the groove opening side to move toward the groove bottom side upon supplying of the bar material into the U-shaped groove from the material rack, and the guide lever being controlled to move from the groove bottom side toward the groove opening side to push out the bar material on the groove opening side upon returning of the bar material to the material rack from the U-shaped groove,
    the support portion including an upper support section for opening or closing the U-shaped groove of the support portion from the groove opening side,
    the upper support section and the guide lever being rotatable with each other by a common support shaft,
    the upper support section being controlled to cooperate with the guide lever in a manner such that when the guide lever receives the bar material on the groove opening side to move toward the groove bottom side, the upper support section closes the U-shaped groove, and when the guide lever moves from the groove bottom side toward the groove opening side, the upper support section opens the U-shaped groove, wherein the upper support section and the guide lever are integrated by the common support shaft and are movable by a common actuator.

* * * * *